(12) United States Patent
Latorre-Martinez et al.

(10) Patent No.: US 9,959,657 B2
(45) Date of Patent: May 1, 2018

(54) COMPUTER GENERATED HEAD

(71) Applicant: Kabushiki Kaisha Toshiba, Minato-ku (JP)

(72) Inventors: Javier Latorre-Martinez, Cambridge (GB); Vincent Ping Leung Wan, Cambridge (GB); Bjorn Stenger, Cambridge (GB); Robert Anderson, Cambridge (GB); Roberto Cipolla, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 26 days.

(21) Appl. No.: 14/167,238

(22) Filed: Jan. 29, 2014

(65) Prior Publication Data

US 2014/0210830 A1     Jul. 31, 2014

(30) Foreign Application Priority Data

Jan. 29, 2013   (GB) .................................. 1301583.9

(51) Int. Cl.
  *G06T 13/80*   (2011.01)
  *G10L 21/10*   (2013.01)
  (Continued)

(52) U.S. Cl.
  CPC ............ *G06T 13/80* (2013.01); *G06T 13/205* (2013.01); *G10L 21/10* (2013.01); *G10L 13/08* (2013.01);
  (Continued)

(58) Field of Classification Search
  CPC ..... G06T 13/205; G06T 13/80; G10L 13/033; G10L 13/08; G10L 17/26; G10L 2021/105; G10L 21/10; G10L 25/63
  See application file for complete search history.

(56) References Cited

U.S. PATENT DOCUMENTS 6,366,885 B1    4/2002  Basu et al.
7,613,613 B2 *  11/2009 Fields ........................... 704/260
  (Continued)

FOREIGN PATENT DOCUMENTS

EP      0 992 933 A3    4/1999
EP      0 992 933 A2    4/2000
  (Continued)

OTHER PUBLICATIONS

Robert Anderson, Bjorn Stenger, Vincent Wan and Roberto Cipolla, "Expressive Visual Text-To-Speech Using Active Appearance Models," IEEE CVPR2013, Jun. 23-28, 2013.*
  (Continued)

*Primary Examiner* — Sing-Wai Wu
(74) *Attorney, Agent, or Firm* — Oblon, McClelland, Maier & Neustadt, L.L.P.

(57) ABSTRACT

A method of animating a computer generation of a head, the head having a mouth which moves in accordance with speech to be output by the head,
  said method comprising:
    providing an input related to the speech which is to be output by the movement of the lips;
    dividing said input into a sequence of acoustic units;
    selecting expression characteristics for the inputted text;
    converting said sequence of acoustic units to a sequence of image vectors using a statistical model, wherein said model has a plurality of model parameters describing probability distributions which relate an acoustic unit to an image vector, said image vector comprising a plurality of parameters which define a face of said head; and
    outputting said sequence of image vectors as video such that the mouth of said head moves to mime the speech associated with the input text with the selected expression,
  (Continued)

wherein a parameter of a predetermined type of each probability distribution in said selected expression is expressed as a weighted sum of parameters of the same type, and wherein the weighting used is expression dependent, such that converting said sequence of acoustic units to a sequence of image vectors comprises retrieving the expression dependent weights for said selected expression, wherein the parameters are provided in clusters, and each cluster comprises at least one sub-cluster, wherein said expression dependent weights are retrieved for each cluster such that there is one weight per sub-cluster.

24 Claims, 20 Drawing Sheets

(51) Int. Cl.
    *G06T 13/20*     (2011.01)
    *G10L 25/63*     (2013.01)
    *G10L 13/08*     (2013.01)

(52) U.S. Cl.
    CPC ........ *G10L 25/63* (2013.01); *G10L 2021/105* (2013.01)

(56) References Cited

U.S. PATENT DOCUMENTS

| | | | |
|---|---|---|---|
| 8,224,652 | B2 | 7/2012 | Wang et al. |
| 2006/0291739 | A1 | 12/2006 | Li et al. |
| 2010/0082345 | A1 | 4/2010 | Wang et al. |
| 2010/0094634 | A1 | 4/2010 | Park |
| 2010/0214289 | A1 | 8/2010 | Xiao et al. |
| 2010/0215255 | A1 | 8/2010 | Xiao et al. |
| 2012/0278081 | A1 | 11/2012 | Chun et al. |
| 2012/0284029 | A1* | 11/2012 | Wang ................ G10L 21/10 704/270 |

FOREIGN PATENT DOCUMENTS

| | | |
|---|---|---|
| GB | 2501062 A | 10/2013 |
| JP | 2003-281567 A | 10/2003 |
| JP | 2008-52628 | 3/2008 |
| JP | 2008-52628 A | 3/2008 |
| JP | 2014-519082 A | 8/2014 |
| WO | WO 2005/031654 A1 | 4/2005 |
| WO | 2007-507784 A | 3/2007 |
| WO | WO 2012/154618 A2 | 11/2012 |

OTHER PUBLICATIONS

Combined International Search Report and Examination dated Jul. 19, 2013, in Application No. GB 1301584.7.

United Kingdom Combined Search and Examination Report dated Jul. 23, 2013, in Great Britain Application No. 1301583.9 filed Jan. 29, 2013, 5 pages.

Office Action dated Jan. 20, 2015 in Japanese Patent Application No. 2014-014924 (with English language translation).

Extended European Search Report dated Apr. 14, 2014 in Patent Application No. 14153137.6.

A. Tanju Erdem, et al., "Advanced Authoring Tools for Game-Based Training", Momentum Digital Media Technologies, XP58009371A, Jul. 13, 2009, pp. 95-102.

Decision of Rejection dated Jun. 30, 2015 in Japanese Patent Application No. 2014-014924 (with English language translation).

Office Action dated Oct. 9, 2015 in European Patent Application No. 14 153 137.6.

Javier Latorre, et al., "Speech factorization for HMM-TTS based on cluster adaptive training." Interspeech 2012 ISCA's 13th Annual Conference, XP55217462, Sep. 2012, pp. 971-974.

Junichi Yamagishi, et al., "HMM-based expressive speech synthesis—towards TTS with arbitrary speaking styles and emotions" Special Workshop in Maui (SWIM), XP55218312, Jan. 12, 2004, 4 Pages.

Heiga Zen, et al., "The HMM-based Speech Synthesis System (HTS) Version 2.0" 6th ISCA Workshop on Speech Synthesis, XP55218252, Aug. 2007, pp. 294-299.

Masatsune Tamura, et al., "Text-to-audio-visual speech synthesis based on parameter generation from HMM" Eurospeech, European Conference on Speech Communication and Technology, XP7001139, Sep. 5, 1999, 4 Pages.

Junichi Yamagishi, et al., "Speaking style adaptation using context clustering decision tree for HMM-based speech synthesis" Proceedings of IEEE International Conference on Acoustics, Speech, and Signal Processing (ICASSP 2004), 2004, XP10717534, pp. 5-8.

Office Action dated Aug. 2, 2016, in Japanese Patent Application No. 2015-194171 (English language translation only).

Office Action dated Jul. 14, 2016, in Chinese Patent Application No. 201410050837.7 (with English language translation).

T.F. Coates, G.J. Edwards, C.J. Taylor, Active Appearance Models ECCV 1998.

Y. Chang and T. Ezzat, Transferable videorealistic speech animation. In SIGGRAPH, pp. 143-151, 2005.

L. Wang, W. Han, X. Qian, and F. Soong. Photo-real lips synthesis with trajectory-guided sampie selection. In Speech Synth. Workshop Int. Speech Comm. Assoc., 2010.

\* cited by examiner

| AAM base | AAM decomp | AAM region | AAM full | Orig video | No pref |
|---|---|---|---|---|---|
| 36 | 37 |  |  |  | 28 |
| 34 |  | 48 |  |  | 18 |
| 34 | 35 | 39 | 53 |  | 13 |
|  | 33 | 51 |  |  | 25 |
|  |  | 30 | 50 |  | 16 |
|  |  |  | 14 | 82 | 20 |
|  |  |  |  |  | 4 |

| AAM base | AAM decomp | AAM region | AAM full | Orig video | No pref |
|---|---|---|---|---|---|
| 40 | 36 |  |  |  | 24 |
| 37 |  | 47 |  |  | 15 |
| 45 |  |  | 41 |  | 14 |
|  | 42 | 35 |  |  | 22 |
|  | 38 | 48 |  |  | 13 |
|  |  | 28 | 46 |  | 26 |
|  |  |  | 11 | 83 | 6 |

| AAM base | AAM decomp | AAM region | AAM full | Orig video | No pref |
|---|---|---|---|---|---|
| 36 |  |  |  |  | 22 |
| 20 | 45 |  |  |  | 5 |
| 22 |  | 75 |  |  | 6 |
|  | 29 | 52 | 72 |  | 19 |
|  | 31 | 49 |  |  | 19 |
|  |  | 33 | 43 |  | 24 |
|  |  |  | 12 | 84 | 4 |

Fig. 23

COMPUTER GENERATED HEAD

FIELD

Embodiments of the present invention as generally described herein relate to a computer generated head and a method for animating such a head.

BACKGROUND

Computer generated talking heads can be used in a number of different situations. For example, for providing information via a public address system, for providing information to the user of a computer etc. Such computer generated animated heads may also be used in computer games and to allow computer generated figures to "talk".

However, there is a continuing need to make such a head seem more realistic.

Systems and methods in accordance with non-limiting embodiments will now be described with reference to the accompanying figures in which.

Figure 1:
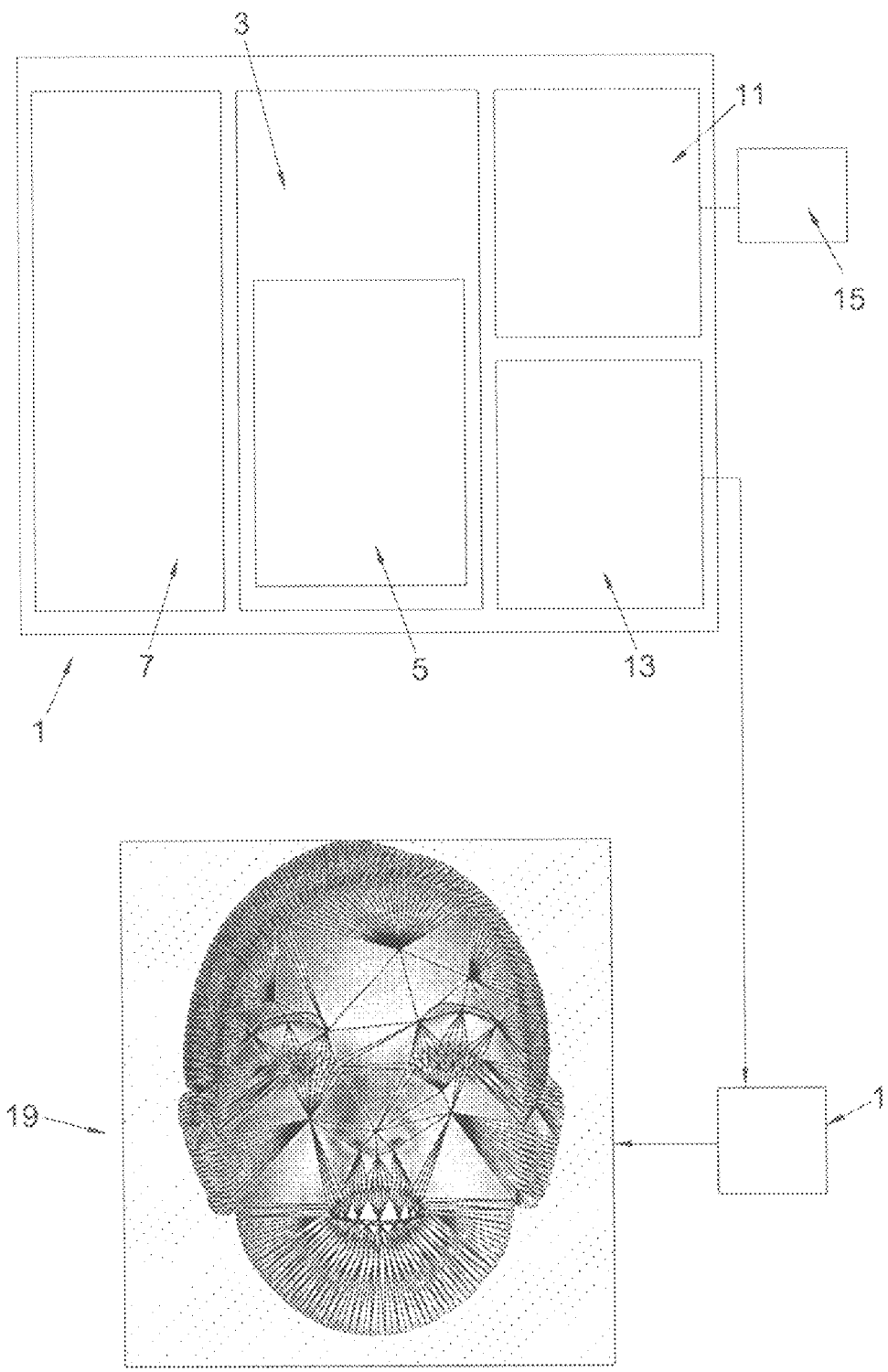
FIG. 1 is a schematic of a system for computer generating a head.

FIG. 22(a) to (d) are confusion matrices for the emotions displayed in test data; and FIG. 23 is a table showing preferences for the variations of the image model.

DETAILED DESCRIPTION

In an embodiment, a method of animating a computer generation of a head is provided, the head having a mouth which moves in accordance with speech to be output by the head, said method comprising:
providing an input related to the speech which is to be output by the movement of the lips;
dividing said input into a sequence of acoustic units;
selecting expression characteristics for the inputted text;
converting said sequence of acoustic units to a sequence of image vectors using a statistical model, wherein said model has a plurality of model parameters describing probability distributions which relate an acoustic unit to an image vector, said image vector comprising a plurality of parameters which define a face of said head; and
outputting said sequence of image vectors as video such that the mouth of said head moves to mime the speech associated with the input text with the selected expression,
wherein a parameter of a predetermined type of each probability distribution in said selected expression is expressed as a weighted sum of parameters of the same type, and wherein the weighting used is expression dependent, such that converting said sequence of acoustic units to a sequence of image vectors comprises retrieving the expression dependent weights for said selected expression, wherein the parameters are provided in clusters, and each cluster comprises at least one sub-cluster, wherein said expression dependent weights are retrieved for each cluster such that there is one weight per sub-cluster.

It should be noted that the mouth means any part of the mouth, for example, the lips, jaw, tongue etc. In a further embodiment, the lips move to mime said input speech.

The above head can output speech visually from the movement of the lips of the head. In a further embodiment, said model is further configured to convert said acoustic units into speech vectors, wherein said model has a plurality of model parameters describing probability distributions which relate an acoustic unit to a speech vector, the method further comprising outputting said sequence of speech vectors as audio which is synchronised with the lip movement of the head. Thus the head can output both audio and video.

The input may be a text input which is divided into a sequence of acoustic units. In a further embodiment, the input is a speech input which is an audio input, the speech input being divided into a sequence of acoustic units and output as audio with the video of the head. Once divided into acoustic units the model can be run to associate the acoustic units derived from the speech input with image vectors such that the head can be generated to visually output the speech signal along with the audio speech signal.

In an embodiment, each sub-cluster may comprises at least one decision tree, said decision tree being based on questions relating to at least one of linguistic, phonetic or prosodic differences. There may be differences in the structure between the decision trees of the clusters and between trees in the sub-clusters. The probability distributions may be selected from a Gaussian distribution, Poisson distribution, Gamma distribution, Student—t distribution or Laplacian distribution.

The expression characteristics may be selected from at least one of different emotions, accents or speaking styles. Variations to the speech will often cause subtle variations to the expression displayed on a speaker's face when speaking and the above method can be used to capture these variations to allow the head to appear natural.

In one embodiment, selecting expression characteristic comprises providing an input to allow the weightings to be selected via the input. Also, selecting expression characteristic comprises predicting from the speech to be outputted the weightings which should be used. In a yet further embodiment, selecting expression characteristic comprises predicting from external information about the speech to be output, the weightings which should be used.

It is also possible for the method to adapt to a new expression characteristic. For example, selecting expression comprises receiving an video input containing a face and varying the weightings to simulate the expression characteristics of the face of the video input.

Where the input data is an audio file containing speech, the weightings which are to be used for controlling the head can be obtained from the audio speech input.

In a further embodiment, selecting an expression characteristic comprises randomly selecting a set of weightings from a plurality of pre-stored sets of weightings, wherein each set of weightings comprises the weightings for all sub-clusters.

The image vector comprises parameters which allow a face to be reconstructed from these parameters. In one embodiment, said image vector comprises parameters which allow the face to be constructed from a weighted sum of modes, and wherein the modes represent reconstructions of a face or part thereof. In a further embodiment, the modes comprise modes to represent shape and appearance of the face. The same weighting parameter may be used for a shape mode and its corresponding appearance mode.

The modes may be used to represent pose of the face, deformation of regions of the face, blinking etc. Static features of the head may be modelled with a fixed shape and texture.

In a further embodiment, a method of adapting a system for rendering a computer generated head to a new expression is provided, the head having a mouth which moves in accordance with speech to be output by the head, the system comprising:
an input for receiving data to the speech which is to be output by the movement of the mouth;
a processor configured to:
divide said input data into a sequence of acoustic units;
allow selection of expression characteristics for the inputted text;
convert said sequence of acoustic units to a sequence of image vectors using a statistical model, wherein said model has a plurality of model parameters describing probability distributions which relate an acoustic unit to an image vector, said image vector comprising a plurality of parameters which define a face of said head; and
output said sequence of image vectors as video such that the mouth of said head moves to mime the speech associated with the input text with the selected expression, wherein a parameter of a predetermined type of each probability distribution in said selected expression is expressed as a weighted sum of parameters of the same type, and wherein the weighting used is expression dependent, such that converting said sequence of acoustic units to a sequence of image vectors comprises retrieving the expression dependent weights for said selected expression, wherein the parameters are provided in clusters, and each cluster comprises at least one sub-cluster, wherein said expression dependent weights are retrieved for each cluster such that there is one weight per sub-cluster, the method comprising:
receiving a new input video file;
calculating the weights applied to the clusters to maximise the similarity between the generated image and the new video file.

The above method may further comprise creating a new cluster using the data from the new video file; and
calculating the weights applied to the clusters including the new cluster to maximise the similarity between the generated image and the new video file.

In an embodiment, a system for rendering a computer generated head is provided, the head having a mouth which moves in accordance with speech to be output by the head,
the system comprising:
an input for receiving data to the speech which is to be output by the movement of the mouth;
a processor configured to:
divide said input data into a sequence of acoustic units;
allow selection of expression characteristics for the inputted text;
convert said sequence of acoustic units to a sequence of image vectors using a statistical model, wherein said model has a plurality of model parameters describing probability distributions which relate an acoustic unit to an image vector, said image vector comprising a plurality of parameters which define a face of said head; and
output said sequence of image vectors as video such that the lips of said head move to mime the speech associated with the input text with the selected expression, wherein a parameter of a predetermined type of each probability distribution in said selected expression is expressed as a weighted sum of parameters of the same type, and wherein the weighting used is expression dependent, such that converting said sequence of acoustic units to a sequence of image vectors comprises retrieving the expression dependent weights for said selected expression, wherein the parameters are provided in clusters, and each cluster comprises at least one sub-cluster, wherein said expression dependent weights are retrieved for each cluster such that there is one weight per sub-cluster.

In an embodiment, an adaptable system for rendering a computer generated head is provided the head having a mouth which moves in accordance with speech to be output by the head, the system comprising:
an input for receiving data to the speech which is to be output by the movement of the mouth;
a processor configured to:
divide said input data into a sequence of acoustic units;
allow selection of expression characteristics for the inputted text;
convert said sequence of acoustic units to a sequence of image vectors using a statistical model, wherein said model has a plurality of model parameters describing probability distributions which relate an acoustic unit to an image vector, said image vector comprising a plurality of parameters which define a face of said head; and output said sequence of image vectors as video such that the lips of said head move to mime the speech associated with the input text with the selected expression, wherein a parameter of a predetermined type of each probability distribution in said selected expression is expressed as a weighted sum of parameters of the same type, and wherein the weighting used is expression dependent, such that converting said sequence of acoustic units to a sequence of image vectors comprises retrieving the expression dependent weights for said selected expression, wherein the parameters are provided in clusters, and each cluster comprises at least one sub-cluster, wherein said expression dependent weights are retrieved for each cluster such that there is one weight per sub-cluster.

the system further comprising a memory configured to store the said parameters provided in clusters and sub-clusters and the weights for said sub-clusters, the system being further configured to receive a new input video file;

the processor being configured to re-calculate the weights applied to the sub-clusters to maximise the similarity between the generated image and the new video file.

The above generated head may be rendered in 2D or 3D. For 3D, the image vectors define the head in 3 dimensions. In 3D, variations in pose are compensated for in the 3D data. However, blinking and static features may be treated as explained above.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1 is a schematic of a system for the computer generation of a head which can talk. The system 1 comprises a processor 3 which executes a program 5. System 1 further comprises storage or memory 7. The storage 7 stores data which is used by program 5 to render the head on display 19. The text to speech system 1 further comprises an input module 11 and an output module 13. The input module 11 is connected to an input for data relating to the speech to be output by the head and the emotion or expression with which the text is to be output. The type of data which is input may take many forms which will be described in more detail later. The input 15 may be an interface which allows a user to directly input data. Alternatively, the input may be a receiver for receiving data from an external storage medium or a network.

Connected to the output module 13 is output is audiovisual output 17. The output 17 comprises a display 19 which will display the generated head.

In use, the system 1 receives data through data input 15. The program 5 executed on processor 3 converts inputted data into speech to be output by the head and the expression which the head is to display. The program accesses the storage to select parameters on the basis of the input data. The program renders the head. The head when animated moves its lips in accordance with the speech to be output and displays the desired expression. The head also has an audio output which outputs an audio signal containing the speech. The audio speech is synchronised with the lip movement of the head.

Figure 2:
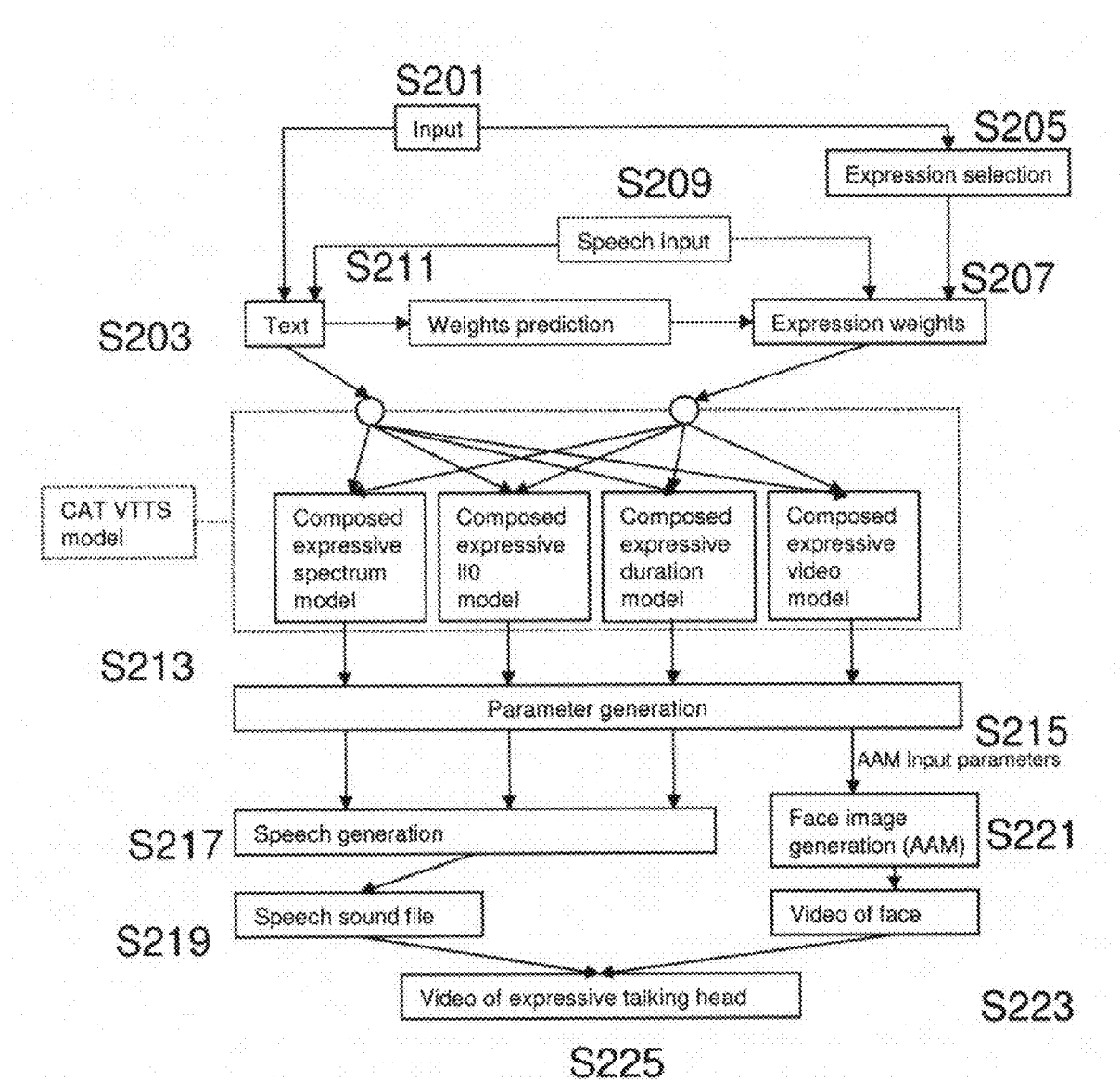
FIG. 2 is a flow diagram showing the basic steps for rendering an animating a generated head in accordance with an embodiment of the invention.

FIG. 2 is a schematic of the basic process for animating and rendering the head. In step S201, an input is received which relates to the speech to be output by the talking head and will also contain information relating to the expression that the head should exhibit while speaking the text.

In this specific embodiment, the input which relates to speech will be text. In FIG. 2 the text is separated from the expression input. However, the input related to the speech does not need to be a text input, it can be any type of signal which allows the head to be able to output speech. For example, the input could be selected from speech input, video input, combined speech and video input. Another possible input would be any form of index that relates to a set of face/speech already produced, or to a predefined text/expression, e.g. an icon to make the system say "please" or "I'm sorry"

For the avoidance of doubt, it should be noted that by outputting speech, the lips of the head move in accordance with the speech to be outputted. However, the volume of the audio output may be silent. In an embodiment, there is just a visual representation of the head miming the words where the speech is output visually by the movement of the lips. In further embodiments, this may or may not be accompanied by an audio output of the speech.

When text is received as an input, it is then converted into a sequence of acoustic units which may be phonemes, graphemes, context dependent phonemes or graphemes and words or part thereof.

In one embodiment, additional information is given in the input to allow expression to be selected in step S205. This then allows the expression weights which will be described in more detail with relation to FIG. 9 to be derived in step S207.

In some embodiments, steps S205 and S207 are combined. This may be achieved in a number of different ways. For example, FIG. 3 shows an interface for selecting the expression. Here, a user directly selects the weighting using, for example, a mouse to drag and drop a point on the screen, a keyboard to input a figure etc. In FIG. 3(b), a selection unit 251 which comprises a mouse, keyboard or the like selects the weightings using display 253. Display 253, in this example has a radar chart which shows the weightings. The user can use the selecting unit 251 in order to change the dominance of the various clusters via the radar chart. It will be appreciated by those skilled in the art that other display methods may be used in the interface. In some embodiments, the user can directly enter text, weights for emotions, weights for pitch, speed and depth.

Pitch and depth can affect the movement of the face since that the movement of the face is different when the pitch goes too high or too low and in a similar way varying the depth varies the sound of the voice between that of a big person and a little person. Speed can be controlled as an extra parameter by modifying the number of frames assigned to each model via the duration distributions.

Figure 3A:
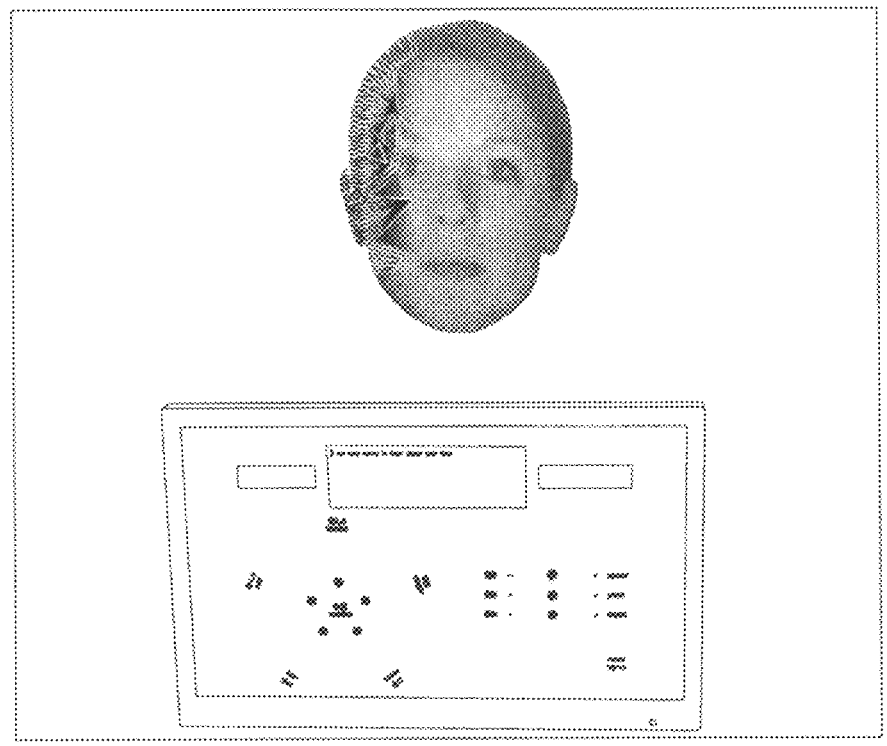
FIG. 3(a) is an image of the generated head with a user interface and FIG. 3(b) is a line drawing of the interface.
Figure 3B:
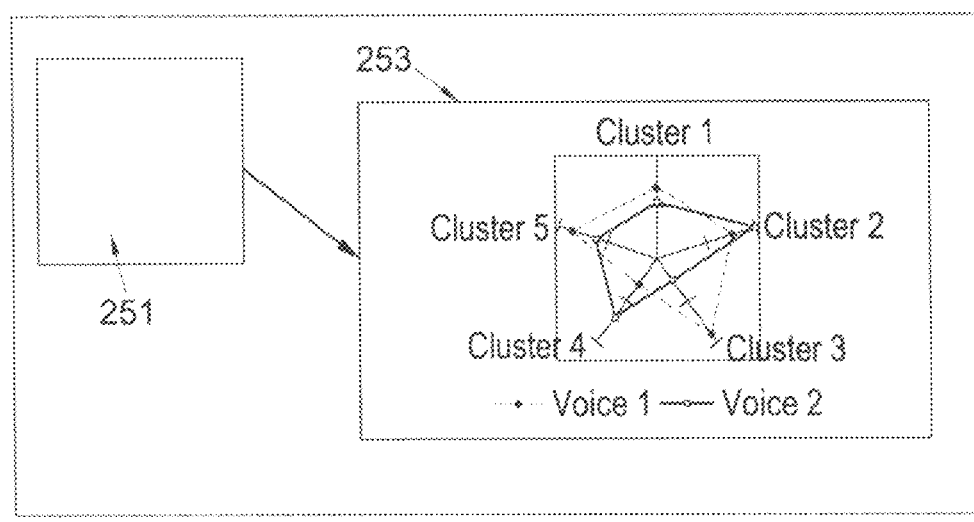

FIG. 3(a) shows the overall unit with the generated head. The head is partially shown with as a mesh without texture. In normal use, the head will be fully textured.

In a further embodiment, the system is provided with a memory which saves predetermined sets of weightings vectors. Each vector may be designed to allow the text to be outputted via the head using a different expression. The expression is displayed by the head and also is manifested in the audio output. The expression can be selected from happy, sad, neutral, angry, afraid, tender etc. In further embodiments the expression can relate to the speaking style of the user, for example, whispering shouting etc or the accent of the user.

Figure 4:
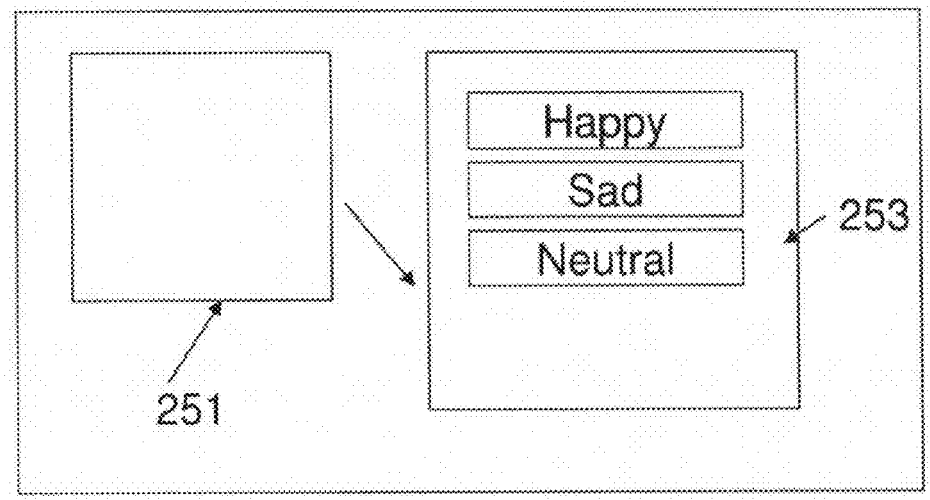
FIG. 4 is a schematic of a system showing how the expression characteristics may be selected.

A system in accordance with such an embodiment is shown in FIG. 4. Here, the display 253 shows different expressions which may be selected by selecting unit 251.

In a further embodiment, the user does not separately input information relating to the expression, here, as shown in FIG. 2, the expression weightings which are derived in S207 are derived directly from the text in step S203.

Figure 5:
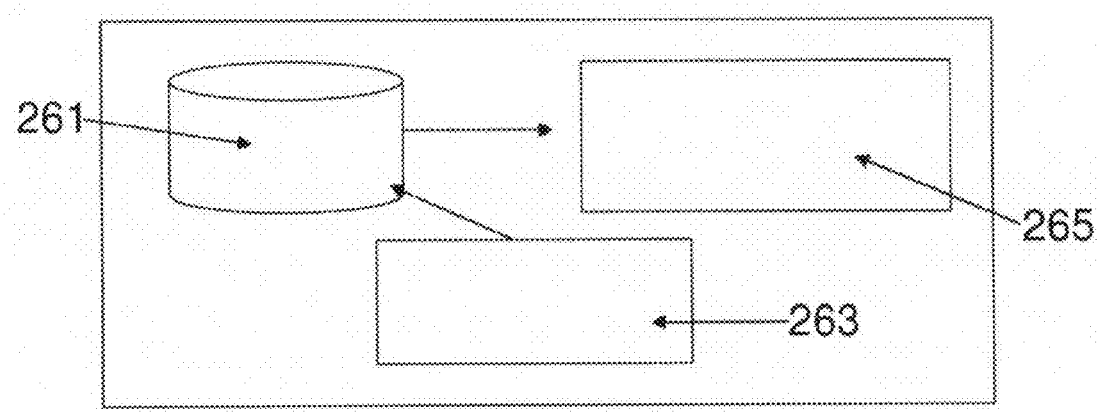
FIG. 5 is a variation on the system of FIG. 4.

Such a system is shown in FIG. 5. For example, the system may need to output speech via the talking head corresponding to text which it recognises as being a command or a question. The system may be configured to output an electronic book. The system may recognise from the text when something is being spoken by a character in the book as opposed to the narrator, for example from quotation marks, and change the weighting to introduce a new expression to be used in the output. Similarly, the system may be configured to recognise if the text is repeated. In such a situation, the voice characteristics may change for the second output. Further the system may be configured to recognise if the text refers to a happy moment, or an anxious moment and the text outputted with the appropriate expression. This is shown schematically in step S211 where the expression weights are predicted directly from the text.

In the above system as shown in FIG. 5, a memory 261 is provided which stores the attributes and rules to be checked in the text. The input text is provided by unit 263 to memory 261. The rules for the text are checked and information concerning the type of expression are then passed to selector unit 265. Selection unit 265 then looks up the weightings for the selected expression.

The above system and considerations may also be applied for the system to be used in a computer game where a character in the game speaks.

Figure 6:
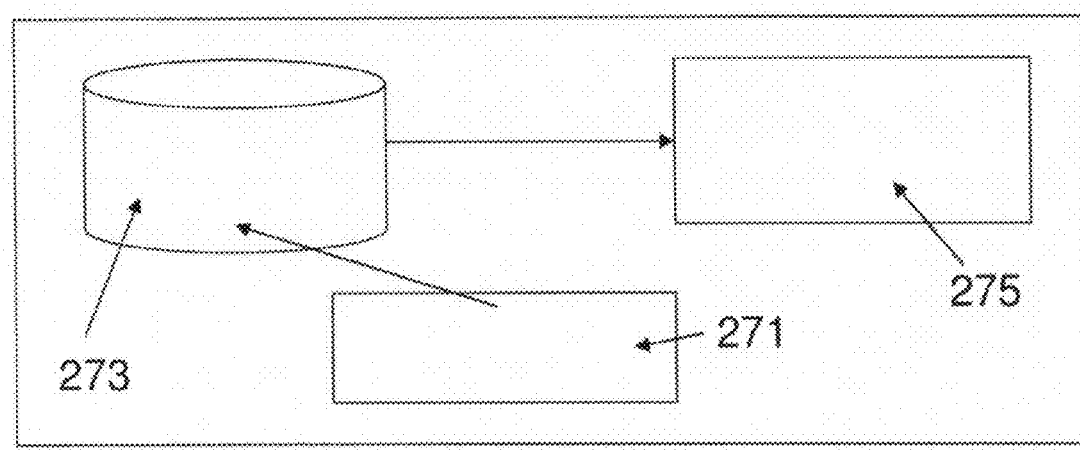
FIG. 6 is a further variation on the system of FIG. 4.

In a further embodiment, the system receives information about how the head should output speech from a further source. An example of such a system is shown in FIG. 6. For example, in the case of an electronic book, the system may receive inputs indicating how certain parts of the text should be outputted.

In a computer game, the system will be able to determine from the game whether a character who is speaking has been injured, is hiding so has to whisper, is trying to attract the attention of someone, has successfully completed a stage of the game etc.

In the system of FIG. 6, the further information on how the head should output speech is received from unit 271. Unit 271 then sends this information to memory 273. Memory 273 then retrieves information concerning how the voice should be output and send this to unit 275. Unit 275 then retrieves the weightings for the desired output from the head.

In a further embodiment, speech is directly input at step S209. Here, step S209 may comprise three sub-blocks: an automatic speech recognizer (ASR) that detects the text from the speech, and aligner that synchronize text and speech, and automatic expression recognizer. The recognised expression is converted to expression weights in S207. The recognised text then flows to text input 203. This arrangement allows an audio input to the talking head system which produces an audio-visual output. This allows for example to have real expressive speech and from there synthesize the appropriate face for it.

In a further embodiment, input text that corresponds to the speech could be used to improve the performance of module S209 by removing or simplifying the job of the ASR sub-module.

In step S213, the text and expression weights are input into an acoustic model which in this embodiment is a cluster adaptive trained HMM or CAT-HMM.

The text is then converted into a sequence of acoustic units. These acoustic units may be phonemes or graphemes. The units may be context dependent e.g. triphones, quinphones etc. which take into account not only the phoneme which has been selected but the proceeding and following phonemes, the position of the phone in the word, the number of syllables in the word the phone belongs to, etc. The text is converted into the sequence of acoustic units using techniques which are well-known in the art and will not be explained further here.

There are many models available for generating a face. Some of these rely on a parameterisation of the face in terms of, for example, key points/features, muscle structure etc.

Thus, a face can be defined in terms of a "face" vector of the parameters used in such a face model to generate a face. This is analogous to the situation in speech synthesis where output speech is generated from a speech vector. In speech synthesis, a speech vector has a probability of being related to an acoustic unit, there is not a one-to-one correspondence. Similarly, a face vector only has a probability of being related to an acoustic unit. Thus, a face vector can be manipulated in a similar manner to a speech vector to produce a talking head which can output both speech and a visual representation of a character speaking. Thus, it is possible to treat the face vector in the same way as the speech vector and train it from the same data.

The probability distributions are looked up which relate acoustic units to image parameters. In this embodiment, the probability distributions will be Gaussian distributions which are defined by means and variances. Although it is possible to use other distributions such as the Poisson, Student-t, Laplacian or Gamma distributions some of which are defined by variables other than the mean and variance.

Considering just the image processing at first, in this embodiment, each acoustic unit does not have a definitive one-to-one correspondence to a "face vector" or "observation" to use the terminology of the art. Said face vector consisting of a vector of parameters that define the gesture of the face at a given frame. Many acoustic units are pronounced in a similar manner, are affected by surrounding acoustic units, their location in a word or sentence, or are pronounced differently depending on the expression, emotional state, accent, speaking style etc of the speaker. Thus, each acoustic unit only has a probability of being related to a face vector and text-to-speech systems calculate many probabilities and choose the most likely sequence of observations given a sequence of acoustic units.

Figure 7:
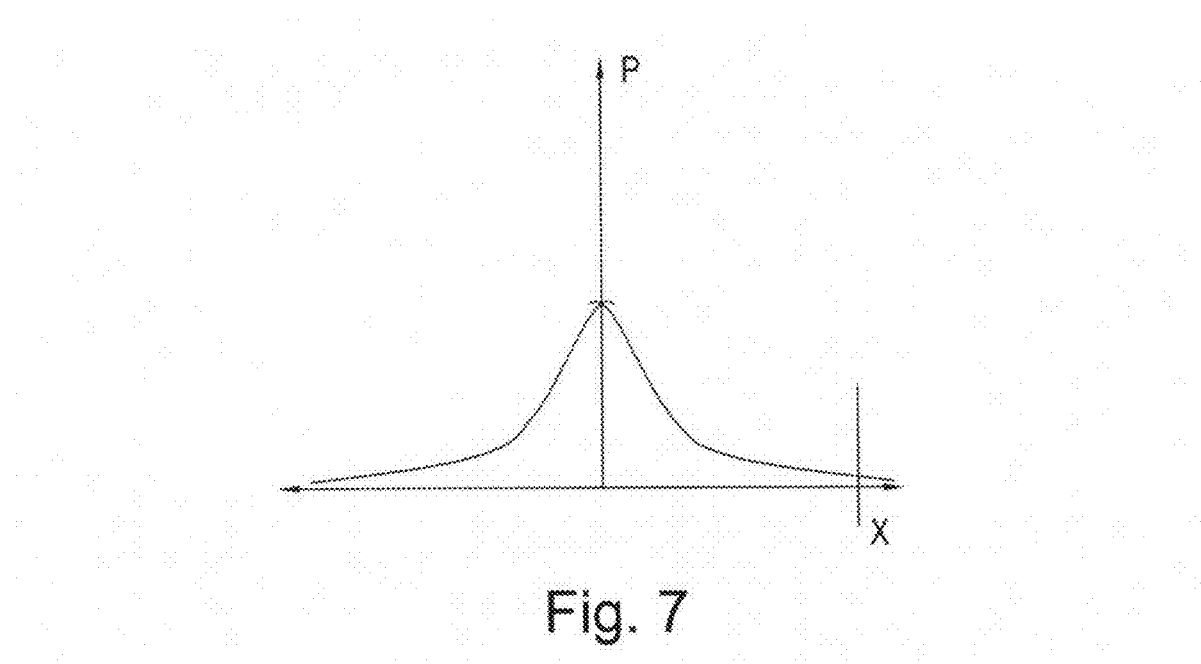
FIG. 7 is a schematic of a Gaussian probability function.

A Gaussian distribution is shown in FIG. 7. FIG. 7 can be thought of as being the probability distribution of an acoustic unit relating to a face vector. For example, the speech vector shown as X has a probability P1 of corresponding to the phoneme or other acoustic unit which has the distribution shown in FIG. 7.

The shape and position of the Gaussian is defined by its mean and variance. These parameters are determined during the training of the system.

These parameters are then used in a model in step S213 which will be termed a "head model". The "head model" is a visual or audio visual version of the acoustic models which are used in speech synthesis. In this description, the head model is a Hidden Markov Model (HMM). However, other models could also be used.

The memory of the talking head system will store many probability density functions relating an to acoustic unit i.e. phoneme, grapheme, word or part thereof to speech parameters. As the Gaussian distribution is generally used, these are generally referred to as Gaussians or components.

In a Hidden Markov Model or other type of head model, the probability of all potential face vectors relating to a specific acoustic unit must be considered. Then the sequence of face vectors which most likely corresponds to the sequence of acoustic units will be taken into account. This implies a global optimization over all the acoustic units of the sequence taking into account the way in which two units affect to each other. As a result, it is possible that the most likely face vector for a specific acoustic unit is not the best face vector when a sequence of acoustic units is considered.

In the flow chart of FIG. 2, a single stream is shown for modelling the image vector as a "compressed expressive video model". In some embodiments, there will be a plurality of different states which will each be modelled using a Gaussian. For example, in an embodiment, the talking head system comprises multiple streams. Such streams might represent parameters for only the mouth, or only the tongue or the eyes, etc. The streams may also be further divided into classes such as silence (sil), short pause (pau) and speech (spe) etc. In an embodiment, the data from each of the streams and classes will be modelled using a HMM. The HMM may comprise different numbers of states, for example, in an embodiment, 5 state HMMs may be used to model the data from some of the above streams and classes. A Gaussian component is determined for each HMM state.

The above has concentrated on the head outputting speech visually. However, the head may also output audio in addition to the visual output. Returning to FIG. 3, the "head model" is used to produce the image vector via one or more streams and in addition produce speech vectors via one or more streams, In FIG. 2, 3 audio streams are shown which are, spectrum, Log F0 and BAP/Cluster adaptive training is an extension to hidden Markov model text-to-speech (HMM-TTS). HMM-TTS is a parametric approach to speech synthesis which models context dependent speech units (CDSU) using HMMs with a finite number of emitting states, usually five. Concatenating the HMMs and sampling from them produces a set of parameters which can then be re-synthesized into synthetic speech. Typically, a decision tree is used to cluster the CDSU to handle sparseness in the training data. For any given CDSU the means and variances to be used in the HMMs may be looked up using the decision tree.

Figure 8:
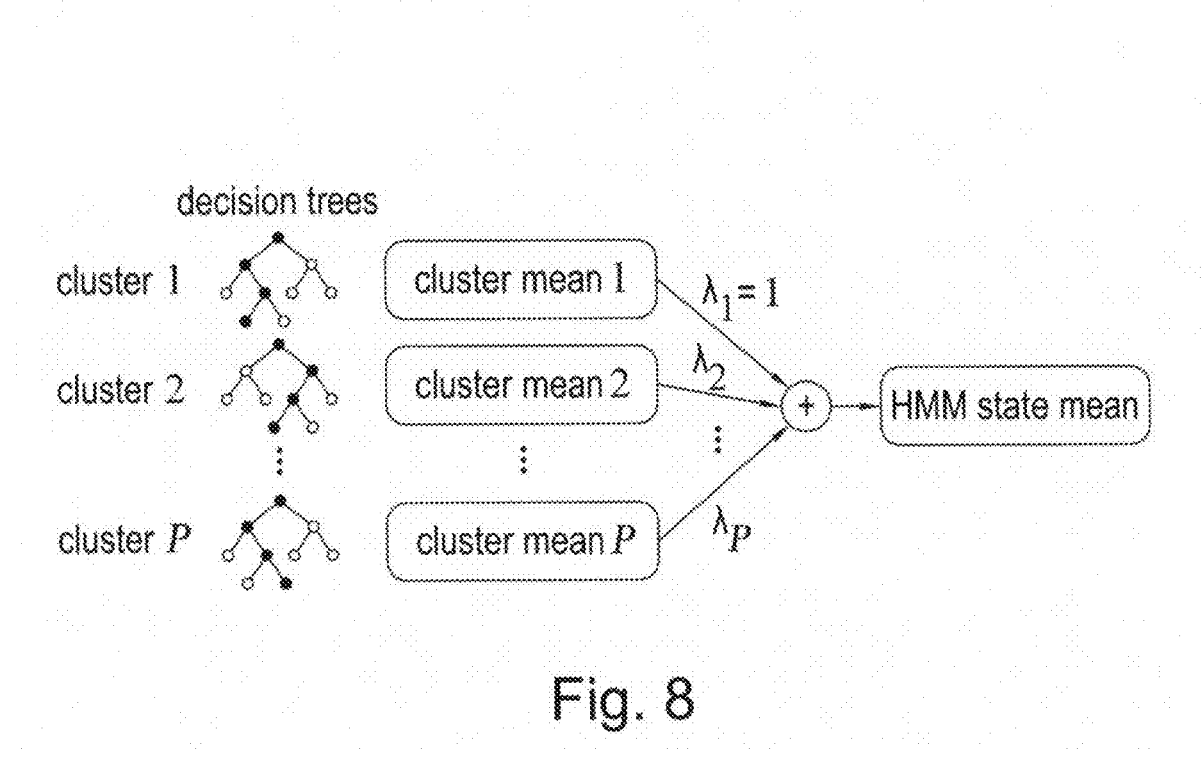
FIG. 8 is a schematic of the clustering data arrangement used in a method in accordance with an embodiment of the present invention.

CAT uses multiple decision trees to capture style- or emotion-dependent information. This is done by expressing each parameter in terms of a sum of weighted parameters where the weighting λ is derived from step S207. The parameters are combined as shown in FIG. 8.

Thus, in an embodiment, the mean of a Gaussian with a selected expression (for either speech or face parameters) is expressed as a weighted sum of independent means of the Gaussians.

$$\mu_m^{(s)} = \sum_i \lambda_i^{(s)} \mu_{c(m,i)} \qquad \text{Eqn. 1}$$

where $\mu_m^{(s)}$ is the mean of component m in with a selected expression s, i∈{1, ..., P} is the index for a cluster with P the total number of clusters, $\lambda_i^{(s)}$ is the expression dependent interpolation weight of the $i^{th}$ cluster for the expression s; $\mu_{c(m,i)}$ is the mean for component m in cluster i. In an embodiment, one of the clusters, for example, cluster i=1, all the weights are always set to 1.0. This cluster is called the 'bias cluster'. Each cluster comprises at least one decision tree. There will be a decision tree for each component in the cluster. In order to simplify the expression, c(m,i)∈{1, ..., N} indicates the general leaf node index for the component m in the mean vectors decision tree for cluster $i^{th}$, with N the total number of leaf nodes across the decision trees of all the clusters. The details of the decision trees will be explained later.

For the head model, the system looks up the means and variances which will be stored in an accessible manner. The head model also receives the expression weightings from step S207. It will be appreciated by those skilled in the art that the voice characteristic dependent weightings may be looked up before or after the means are looked up.

The expression dependent means i.e. using the means and applying the weightings, are then used in a head model in step S213.

The face characteristic independent means are clustered. In an embodiment, each cluster comprises at least one decision tree, the decisions used in said trees are based on linguistic, phonetic and prosodic variations. In an embodiment, there is a decision tree for each component which is a member of a cluster. Prosodic, phonetic, and linguistic contexts affect the facial gesture. Phonetic contexts typically affects the position and movement of the mouth, and prosodic (e.g. syllable) and linguistic (e.g., part of speech of words) contexts affects prosody such as duration (rhythm) and other parts of the face, e.g., the blinking of the eyes. Each cluster may comprise one or more sub-clusters where each sub-cluster comprises at least one of the said decision trees.

The above can either be considered to retrieve a weight for each sub-cluster or a weight vector for each cluster, the components of the weight vector being the weightings for each sub-cluster.

The following configuration may be used in accordance with an embodiment of the present invention. To model this data, in this embodiment, 5 state HMMs are used. The data is separated into three classes for this example: silence, short pause, and speech.

In this particular embodiment, the allocation of decision trees and weights per sub-cluster are as follows.

In this particular embodiment the following streams are used per cluster:
Spectrum: 1 stream, 5 states, 1 tree per state×3 classes
Log F0: 3 streams, 5 states per stream, 1 tree per state and stream×3 classes
BAP: 1 stream, 5 states, 1 tree per state×3 classes
VID: 1 stream, 5 states, 1 tree per state×3 classes Duration: 1 stream, 5 states, 1 tree×3 classes (each tree is shared across all states)
Total: 3×31=93 decision trees
For the above, the following weights are applied to each stream per expression characteristic:
Spectrum: 1 stream, 5 states, 1 weight per stream×3 classes
Log F0: 3 streams, 5 states per stream, 1 weight per stream×3 classes
BAP: 1 stream, 5 states, 1 weight per stream×3 classes
VID: 1 stream, 5 states, 1 weight per stream×3 classes
Duration: 1 stream, 5 states, 1 weight per state and stream×3 classes
Total: 3×11=33 weights.

As shown in this example, it is possible to allocate the same weight to different decision trees (VID) or more than one weight to the same decision tree (duration) or any other combination. As used herein, decision trees to which the same weighting is to be applied are considered to form a sub-cluster.

In one embodiment, the audio streams (spectrum, log F0) are not used to generate the video of the talking head during synthesis but are needed during training to align the audio-visual stream with the text.

The following table shows which streams are used for alignment, video and audio in accordance with an embodiment of the present invention.

| Stream | Used for alignment | Used for video synthesis | Used for audio synthesis |
| --- | --- | --- | --- |
| Spectrum | Yes | No | Yes |
| LogF0 | Yes | No | Yes |
| BAP | No | No | Yes (but may be omitted) |
| VID | No | Yes | No |
| Duration | Yes | Yes | Yes |

In an embodiment, the mean of a Gaussian distribution with a selected voice characteristic is expressed as a weighted sum of the means of a Gaussian component, where the summation uses one mean from each cluster, the mean being selected on the basis of the prosodic, linguistic and phonetic context of the acoustic unit which is currently being processed.

Figure 9:
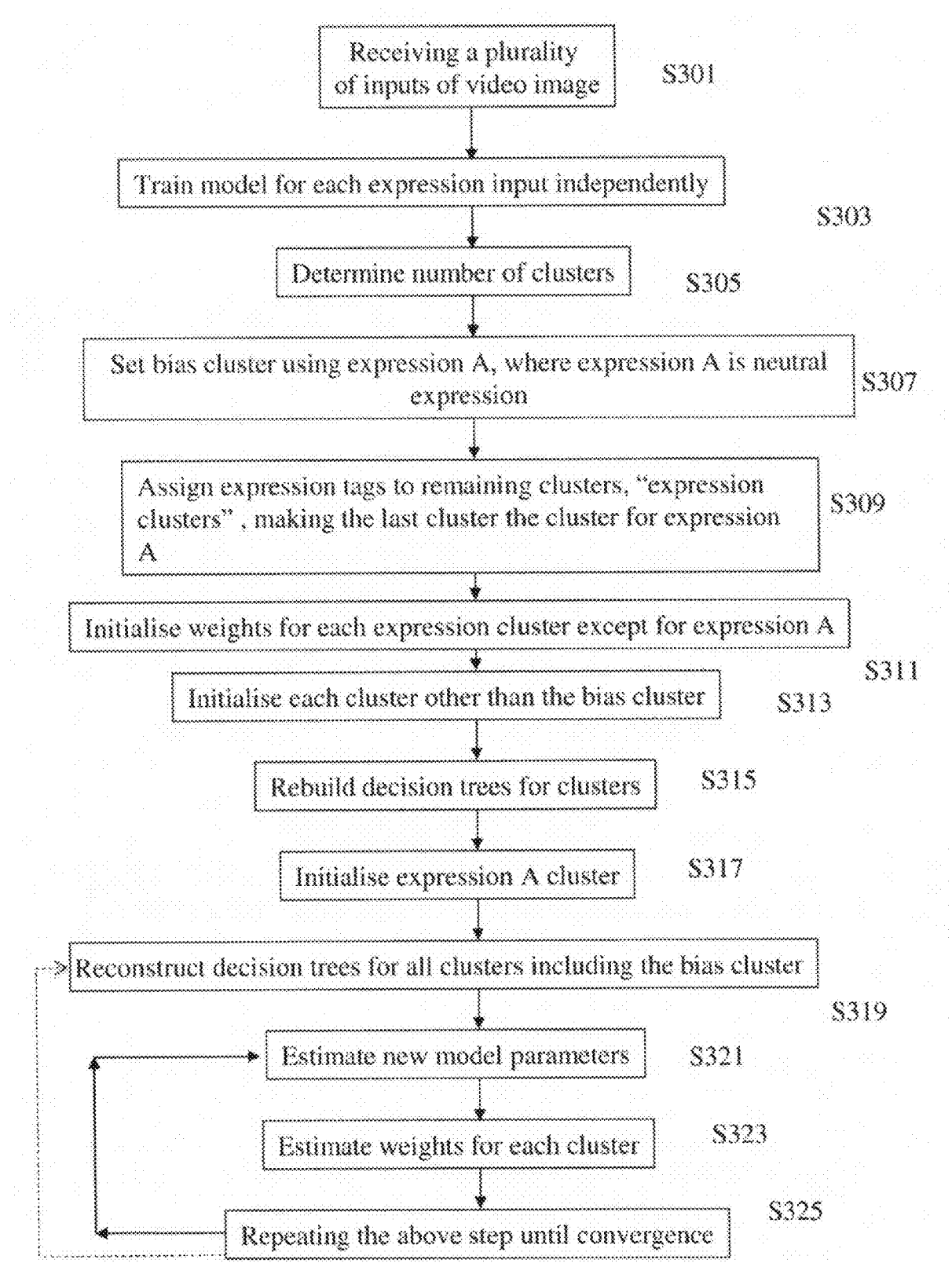
FIG. 9 is a flow diagram demonstrating a method of training a head generation system in accordance with an embodiment of the present invention.

The training of the model used in step S213 will be explained in detail with reference to FIGS. 9 to 11. FIG. 2 shows a simplified model with four streams, 3 related to producing the speech vector (1 spectrum, 1 Log F0 and 1 duration) and one related to the face/VID parameters. (However, it should be noted from above, that many embodiments will use additional streams and multiple streams may be used to model each speech or video parameter. For example, in this figure BAP stream has been removed for simplicity. This corresponds to a simple pulse/noise type of excitation. However the mechanism to include it or any other video or audio stream is the same as for represented streams.) These produce a sequence of speech vectors and a sequence of face vectors which are output at step S215.

The speech vectors are then fed into the speech generation unit in step S217 which converts these into a speech sound file at step S219. The face vectors are then fed into face image generation unit at step S221 which converts these parameters to video in step S223. The video and sound files are then combined at step S225 to produce the animated talking head.

Next, the training of a system in accordance with an embodiment of the present invention will be described with reference to FIG. 9.

In image processing systems which are based on Hidden Markov Models (HMMs), the HMM is often expressed as:

$$M=(A,B,\Pi) \qquad \text{Eqn. 2}$$

where $A=\{a_{ij}\}_{i,j=1}^{N}$ and is the state transition probability distribution, $B=\{b_j(o)\}_{j=1}^{N}$ is the state output probability distribution and $\Pi=\{\pi_i\}_{i=1}^{N}$ is the initial state probability distribution and where N is the number of states in the HMM.

As noted above, the face vector parameters can be derived from a HMM in the same way as the speech vector parameters.

In the current embodiment, the state transition probability distribution A and the initial state probability distribution are determined in accordance with procedures well known in the art. Therefore, the remainder of this description will be concerned with the state output probability distribution.

Generally in talking head systems the state output vector or image vector o(t) from an $m^{th}$ Gaussian component in a model set M is $$P(o(t)|m,s,\mathcal{M})=N(o(t);\mu_m^{(s)},\Sigma_m^{(s)}) \qquad \text{Eqn. 3}$$

where $\mu^{(s)}_m$ and $\Sigma^{(s)}_m$ are the mean and covariance of the $m^{th}$ Gaussian component for speaker s.

The aim when training a conventional talking head system is to estimate the Model parameter set M which maximises likelihood for a given observation sequence. In the conventional model, there is one single speaker from which data is collected and the emotion is neutral, therefore the model parameter set is $\mu^{(s)}_m=\mu_m$ and $\Sigma^{(s)}_m=\Sigma_m$ for the all components m.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(\mathcal{M},\mathcal{M}') = \sum_{m,t} \gamma_m(t)\log p(o(t),m|\mathcal{M}) \qquad \text{Eqn 4}$$

where $\gamma_m(t)$ is the posterior probability of component m generating the observation o(t) given the current model parameters M and M is the new parameter set. After each iteration, the parameter set M' is replaced by the new parameter set M which maximises Q(M, M'). p(o(t), m|M) is a generative model such as a GMM, HMM etc.

In the present embodiment a HMM is used which has a state output vector of:

$$P(o(t)|m,s,\mathcal{M})=N(o(t);\hat{\mu}_m^{(s)},\hat{\Sigma}_{v(m)}^{(s)}) \qquad \text{Eqn. 5}$$

Where m∈{1, ..., MN}, t∈{1, ..., T} and s∈{1, ... S} are indices for component, time and expression respectively and where MN, T, and S are the total number of components, frames, and speaker expression respectively. Here data is collected from one speaker, but the speaker will exhibit different expressions.

The exact form of $\hat{\mu}_m^{(s)}$ and $\hat{\Sigma}_m^{(s)}$ depends on the type of expression dependent transforms that are applied. In the most general way the expression dependent transforms includes:

a set of expression dependent weights $\lambda_{q(m)}^{(s)}$
a expression-dependent cluster $\mu_{c(m,x)}^{(s)}$
a set of linear transforms $[A_{r(m)}^{(s)}, b_{r(m)}^{(s)}]$ After applying all the possible expression dependent transforms in step 211, the mean vector $\hat{\mu}_m^{(s)}$ and covariance matrix $\hat{\Sigma}_m^{(s)}$ of the probability distribution m for expression s become $$\overline{\mu}_m^{(s)} = A_{r(m)}^{(s)-1} \left( \sum_i \lambda_i^{(s)} \mu_{c(m,i)} + (\mu_{c(m,x)}^{(s)} - b_{r(m)}^{(s)}) \right) \quad \text{Eqn 6}$$

$$\overline{\Sigma}_m^{(s)} = \left( A_{r(m)}^{(s)\top} \sum_{v(m)}^{-1} A_{r(m)}^{(s)} \right)^{-1} \quad \text{Eqn 7}$$

where $\mu_{c(m,i)}$ are the means of cluster/for component m as described in Eqn. 1, $\mu_{c(m,x)}^{(s)}$ is the mean vector for component m of the additional cluster for the expression s, which will be described later, and $A_{r(m)}^{(s)}$ and $b_{r(m)}^{(s)}$ are the linear transformation matrix and the bias vector associated with regression class r(m) for the expression s.

R is the total number of regression classes and $r(m) \in \{1, \ldots, R\}$ denotes the regression class to which the component m belongs.

If no linear transformation is applied $A_{r(m)}^{(s)}$ and $b_{r(m)}^{(s)}$ become an identity matrix and zero vector respectively.

For reasons which will be explained later, in this embodiment, the covariances are clustered and arranged into decision trees where $v(m) \in \{1, \ldots, V\}$ denotes the leaf node in a covariance decision tree to which the co-variance matrix of the component m belongs and V is the total number of variance decision tree leaf nodes.

Using the above, the auxiliary function can be expressed as:

$$Q(M, M') = \quad \text{Eqn 8}$$
$$-\frac{1}{2} \sum_{m,t,s} \gamma_m(t) \left\{ \log |\overline{\Sigma}_{v(m)}| + (o(t) - \overline{\mu}_m^{(s)})^T \overline{\Sigma}_{v(m)}^{-1} (o(t) - \overline{\mu}_m^{(s)}) \right\} + C$$

where C is a constant independent of M

Thus, using the above and substituting equations 6 and 7 in equation 8, the auxiliary function shows that the model parameters may be split into four distinct parts.

The first part are the parameters of the canonical model i.e. expression independent means $\{\mu_n\}$ and the expression independent covariance $\{\Sigma_k\}$ the above indices n and k indicate leaf nodes of the mean and variance decision trees which will be described later. The second part are the expression dependent weights $\{\lambda_i^{(s)}\}_{s,i}$ where s indicates expression and i the cluster index parameter. The third part are the means of the expression dependent cluster $\mu_{c(m,x)}$ and the fourth part are the CMLLR constrained maximum likelihood linear regression transforms $\{A_d^{(s)}, b_d^{(s)}\}_{s,d}$ where s indicates expression and d indicates component or expression regression class to which component m belongs.

In detail, for determining the ML estimate of the mean, the following procedure is performed.

To simplify the following equations it is assumed that no linear transform is applied. If a linear transform is applied, the original observation vectors $\{o_r(t)\}$ have to be substituted by the transformed vectors $$\{\hat{o}_{r(m)}^{(s)}(t) = A_{r(m)}^{(s)} o(t) + b_{r(m)}^{(s)}\} \quad \text{Eqn. 9}$$

Similarly, it will be assumed that there is no additional cluster. The inclusion of that extra cluster during the training is just equivalent to adding a linear transform on which $A_{r(m)}^{(s)}$ is the identity matrix and $\{b_{r(m)}^{(s)} = \mu_{c(m,x)}^{(s)}\}$ First, the auxiliary function of equation 4 is differentiated with respect to $\mu_n$ as follows:

$$\frac{\partial Q(M; \hat{M})}{\partial \mu_n} = k_n - G_{nn}\mu_n - \sum_{v \neq n} G_{nv} \mu_v \quad \text{Eqn. 10}$$

Where $$G_{nv} = \sum_{\substack{m,i,j \\ c(m,i)=n \\ c(m,j)=v}} G_{ij}^{(m)}, \quad k_n = \sum_{\substack{m,i \\ c(m,i)=n}} k_i^{(m)}. \quad \text{Eqn. 11}$$

with $G_{ij}^{(m)}$ and $k_i^{(m)}$ accumulated statistics $$G_{ij}^{(m)} = \sum_{t,s} \gamma_m(t,s) \lambda_{i,q(m)}^{(s)} \sum_{v(m)}^{-1} \lambda_{j,q(m)}^{(s)} \quad \text{Eqn. 12}$$

$$k_i^{(m)} = \sum_{t,s} \gamma_m(t,s) \lambda_{i,q(m)}^{(s)} \sum_{v(m)}^{-1} o(t).$$

By maximizing the equation in the normal way by setting the derivative to zero, the following formula is achieved for the ML estimate of $\mu_n$ i.e. $\hat{\mu}_n$:

$$\hat{\mu}_n = G_{nn}^{-1} \left( k_n - \sum_{v \neq n} G_{nv} \mu_v \right) \quad \text{Eqn. 13}$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix}, \quad \text{Eqn. 14}$$

However, if the training data is small or N is quite large, the coefficient matrix of equation 7 cannot have full rank. This problem can be avoided by using singular value decomposition or other well-known matrix factorization techniques.

The same process is then performed in order to perform an ML estimate of the covariances i.e. the auxiliary function shown in equation (8) is differentiated with respect to $\Sigma_k$ to give:

$$\hat{\Sigma}_k = \frac{\sum_{\substack{t,s,m \\ v(m)=k}} \gamma_m(t,s) \overline{o}(t) \overline{o}(t)^T}{\sum_{\substack{t,s,m \\ v(m)=k}} \gamma_m(t,s)} \quad \text{Eqn. 15}$$

Where $$\overline{o}(t) = o(t) - \mu_m^{(s)} \quad \text{Eqn. 16}$$

The ML estimate for expression dependent weights and the expression dependent linear transform can also be obtained in the same manner i.e. differentiating the auxiliary function with respect to the parameter for which the ML estimate is required and then setting the value of the differential to 0.

For the expression dependent weights this yields $$\lambda_q^{(s)} = \left(\sum_{\substack{t,m \\ q(m)=q}} \gamma_m(t,s) M_m^T {\sum}^{-1} M_m\right)^{-1} \sum_{\substack{t,m \\ q(m)=q}} \gamma_m(t,s) M_m^T {\sum}^{-1} o(t) \quad \text{Eqn. 17}$$

In a preferred embodiment, the process is performed in an iterative manner. This basic system is explained with reference to the flow diagram of FIG. 9.

In step S301, a plurality of inputs of video image are received. In this illustrative example, 1 speaker is used, but the speaker exhibits 3 different emotions when speaking and also speaks with a neutral expression. The data both audio and video is collected so that there is one set of data for the neutral expression and three further sets of data, one for each of the three expressions.

Next, in step S303, an audiovisual model is trained and produced for each of the 4 data sets. The input visual data is parameterised to produce training data. Possible methods are explained in relation to the training for the image model with respect to FIG. 19. The training data is collected so that there is an acoustic unit which is related to both a speech vector and an image vector. In this embodiment, each of the 4 models is only trained using data from one face.

A cluster adaptive model is initialised and trained as follows:

In step S305, the number of clusters P is set to V+1, where V is the number of expressions (4).

In step S307, one cluster (cluster 1), is determined as the bias cluster. In an embodiment, this will be the cluster for neutral expression. The decision trees for the bias cluster and the associated cluster mean vectors are initialised using the expression which in step S303 produced the best model. In this example, each face is given a tag "Expression A (neutral)", "Expression B", "Expression C" and "Expression D", here The covariance matrices, space weights for multi-space probability distributions (MSD) and their parameter sharing structure are also initialised to those of the Expression A (neutral) model.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data. Providing that this increase exceeds a threshold, the node is divided using the optimal question and two new terminal nodes are created. The process stops when no new terminal nodes can be formed since any further splitting will not exceed the threshold applied to the likelihood split.

Figure 10:
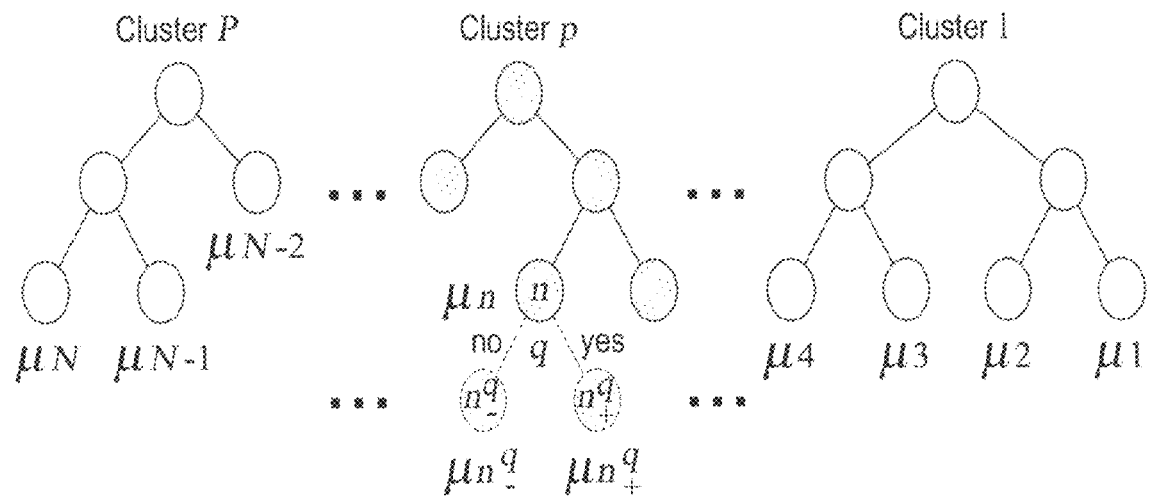
FIG. 10 is a schematic of decision trees used by embodiments in accordance with the present invention.

This process is shown for example in FIG. 10. The nth terminal node in a mean decision tree is divided into two new terminal nodes $n_+^q$ and $n_-^q$ by a question q. The likelihood gain achieved by this split can be calculated as follows:

$$\mathcal{L}(n) = -\frac{1}{2}\mu_n^T\left(\sum_{m \in S(n)} G_{ii}^{(m)}\right)\mu_n + \mu_n^T \sum_{m \in S(n)}\left(k_i^{(m)} - \sum_{j \neq i} G_{ij}^{(m)}\mu_{c(m,j)}\right) \quad \text{Eqn. 18}$$

Where S(n) denotes a set of components associated with node n. Note that the terms which are constant with respect to $\mu_n$ are not included.

Where C is a constant term independent of $\mu_n$. The maximum likelihood of $\mu_n$ is given by equation 13 Thus, the above can be written as:

$$\mathcal{L}(n) = \frac{1}{2}\hat{\mu}_n^T\left(\sum_{m \in S(n)} G_{ii}^{(m)}\right)\hat{\mu}_n \quad \text{Eqn. 19}$$

Thus, the likelihood gained by splitting node n into $n_+^q$ and $n_-^q$ is given by:

$$\Delta L(n;q)=L(n_+^q)+L(n_-^q)-L(n) \quad \text{Eqn. 20}$$

Using the above, it is possible to construct a decision tree for each cluster where the tree is arranged so that the optimal question is asked first in the tree and the decisions are arranged in hierarchical order according to the likelihood of splitting. A weighting is then applied to each cluster.

Decision trees might be also constructed for variance. The covariance decision trees are constructed as follows: If the case terminal node in a covariance decision tree is divided into two new terminal nodes $k_+^q$ and $k_-^q$ by question q, the cluster covariance matrix and the gain by the split are expressed as follows:

$$\sum_k = \frac{\sum_{\substack{m,t,s \\ v(m)=k}} \gamma_m(t) \sum_{v(m)}}{\sum_{\substack{m,t,s \\ v(m)=k}} \gamma_m(t)} \quad \text{Eqn. 21}$$

$$\mathcal{L}(k) = -\frac{1}{2}\sum_{\substack{m,t,s \\ v(m)=k}} \gamma_m(t)\log|\Sigma_k| + D \quad \text{Eqn. 22}$$

where D is constant independent of $\{\Sigma_k\}$. Therefore the increment in likelihood is $$\Delta L(k,q)=L(k_+^q)+L(k_-^q)-L(k) \quad \text{Eqn. 23}$$

In step S309, a specific expression tag is assigned to each of 2, . . . , P clusters e.g. clusters 2, 3, 4, and 5 are for expressions B, C, D and A respectively. Note, because expression A (neutral) was used to initialise the bias cluster it is assigned to the last cluster to be initialised.

In step S311, a set of CAT interpolation weights are simply set to 1 or 0 according to the assigned expression (referred to as "voicetag" below) as:

$$\lambda_i^{(s)} = \begin{cases} 1.0 & \text{if } i = 0 \\ 1.0 & \text{if voicetag}(s) = i \\ 0.0 & \text{otherwise} \end{cases}$$

In this embodiment, there are global weights per expression, per stream. For each expression/stream combination 3 sets of weights are set: for silence, image and pause.

In step S313, for each cluster 2, . . . , (P−1) in turn the clusters are initialised as follows. The face data for the associated expression, e.g. expression B for cluster 2, is aligned using the mono-speaker model for the associated face trained in step S303. Given these alignments, the statistics are computed and the decision tree and mean values for the cluster are estimated. The mean values for the cluster are computed as the normalised weighted sum of the cluster means using the weights set in step S311 i.e. in practice this results in the mean values for a given context being the weighted sum (weight 1 in both cases) of the bias cluster mean for that context and the expression B model mean for that context in cluster 2.

In step S315, the decision trees are then rebuilt for the bias cluster using all the data from all 4 faces, and associated means and variance parameters re-estimated.

After adding the clusters for expressions B, C and D the bias cluster is re-estimated using all 4 expressions at the same time In step S317, Cluster P (Expression A) is now initialised as for the other clusters, described in step S313, using data only from Expression A.

Once the clusters have been initialised as above, the CAT model is then updated/trained as follows.

In step S319 the decision trees are re-constructed cluster-by-cluster from cluster 1 to P, keeping the CAT weights fixed. In step S321, new means and variances are estimated in the CAT model. Next in step S323, new CAT weights are estimated for each cluster. In an embodiment, the process loops back to S321 until convergence.

The parameters and weights are estimated using maximum likelihood calculations performed by using the auxiliary function of the Baum-Welch algorithm to obtain a better estimate of said parameters.

As previously described, the parameters are estimated via an iterative process.

In a further embodiment, at step S323, the process loops back to step S319 so that the decision trees are reconstructed during each iteration until convergence.

In a further embodiment, expression dependent transforms as previously described are used. Here, the expression dependent transforms are inserted after step S323 such that the transforms are applied and the transformed model is then iterated until convergence. In an embodiment, the transforms would be updated on each iteration.

FIG. 10 shows clusters 1 to P which are in the forms of decision trees. In this simplified example, there are just four terminal nodes in cluster 1 and three terminal nodes in cluster P. It is important to note that the decision trees need not be symmetric i.e. each decision tree can have a different number of terminal nodes. The number of terminal nodes and the number of branches in the tree is determined purely by the log likelihood splitting which achieves the maximum split at the first decision and then the questions are asked in order of the question which causes the larger split. Once the split achieved is below a threshold, the splitting of a node terminates.

The above produces a canonical model which allows the following synthesis to be performed:
1. Any of the 4 expressions can be synthesised using the final set of weight vectors corresponding to that expression
2. A random expression can be synthesised from the audio-visual space spanned by the CAT model by setting the weight vectors to arbitrary positions.

In a further example, the assistant is used to synthesise an expression characteristic where the system is given an input of a target expression with the same characteristic.

In a further example, the assistant is used to synthesise an expression where the system is given an input of the speaker exhibiting the expression.

Figure 11:
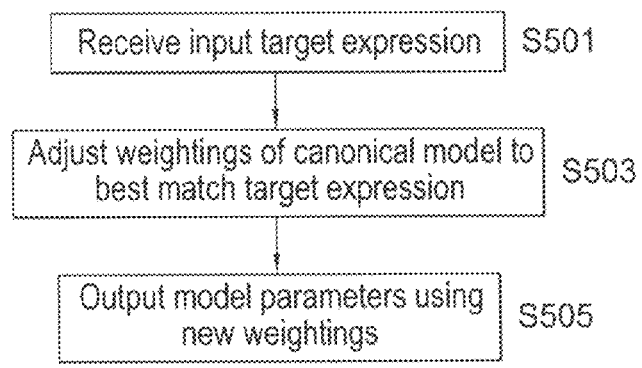
FIG. 11 is a flow diagram showing the adapting of a system in accordance with an embodiment of the present invention.

FIG. 11 shows one example. First, the input target expression is received at step 501. Next, the weightings of the canonical model i.e. the weightings of the clusters which have been previously trained, are adjusted to match the target expression in step 503.

The face video is then outputted using the new weightings derived in step S503.

Figure 12:
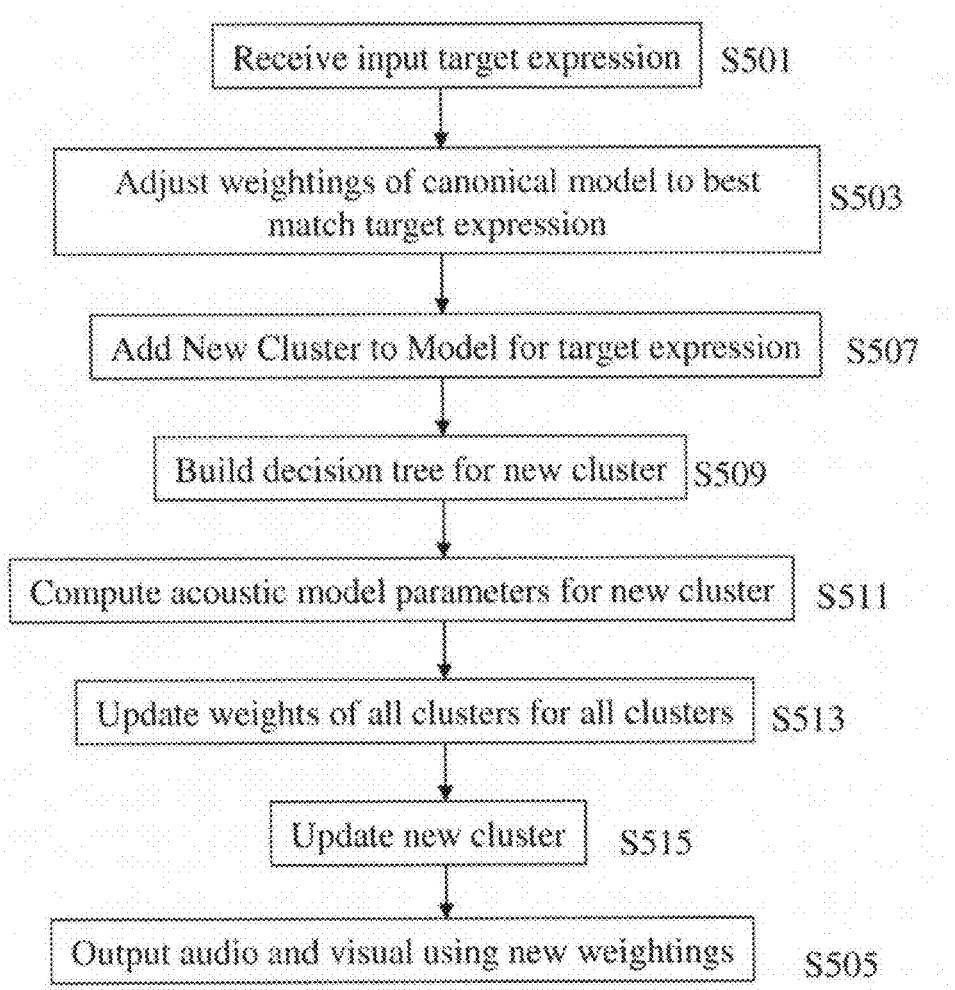
FIG. 12 is a flow diagram showing the adapting of a system in accordance with a further embodiment of the present invention.

In a further embodiment, a more complex method is used where a new cluster is provided for the new expression. This will be described with reference to FIG. 12.

As in FIG. 11, first, data of the speaker speaking exhibiting the target expression is received in step S501. The weightings are then adjusted to best match the target expression in step S503.

Then, a new cluster is added to the model for the target expression in step S507. Next, the decision tree is built for the new expression cluster in the same manner as described with reference to FIG. 9.

Then, the model parameters i.e. in this example, the means are computed for the new cluster in step S511.

Next, in step S513, the weights are updated for all clusters. Then, in step S515, the structure of the new cluster is updated.

As before, the speech vector and face vector with the new target expression is outputted using the new weightings with the new cluster in step S505.

Note, that in this embodiment, in step S515, the other clusters are not updated at this time as this would require the training data to be available at synthesis time.

In a further embodiment the clusters are updated after step S515 and thus the flow diagram loops back to step S509 until convergence.

Finally, in an embodiment, a linear transform such as CMLLR can be applied on top of the model to further improve the similarity to the target expression. The regression classes of this transform can be global or be expression dependent.

In the second case the tying structure of the regression classes can be derived from the decision tree of the expression dependent cluster or from a clustering of the distributions obtained after applying the expression dependent weights to the canonical model and adding the extra cluster.

At the start, the bias cluster represents expression independent characteristics, whereas the other clusters represent their associated voice data set. As the training progresses the precise assignment of cluster to expression becomes less precise. The clusters and CAT weights now represent a broad acoustic space.

The above embodiments refer to the clustering using just one attribute i.e. expression. However, it is also possible to factorise voice and facial attributes to obtain further control. In the following embodiment, expression is subdivided into speaking style(s) and emotion(e) and the model is factorised for these two types or expressions or attributes. Here, the state output vector or vector comprised of the model parameters o(t) from an $m^{th}$ Gaussian component in a model set M is $$P(o(t)|m,s,e,\mathcal{M}) = N(o(t); \mu_m^{(s,e)}, \Sigma_m^{(s,e)}) \qquad \text{Eqn. 24}$$

where $\mu_m^{(s,e)}$ and $\Sigma_m^{(s,e)}$ are the mean and covariance of the $m^{th}$ Gaussian component for speaking style s and emotion e.

In this embodiment, s will refer to speaking style/voice. Speaking style can be used to represent styles such as whispering, shouting etc. It can also be used to refer to accents etc.

Similarly, in this embodiment only two factors are considered but the method could be extended to other speech factors or these factors could be subdivided further and factorisation is performed for each subdivision.

The aim when training a conventional text-to-speech system is to estimate the Model parameter set M which maximises likelihood for a given observation sequence. In the conventional model, there is one style and expression/emotion, therefore the model parameter set is $\mu^{(s,e)}_m = \mu_m$ and $\Sigma^{(s,e)}_m = \Sigma_m$ for the all components m.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(\mathcal{M}, \mathcal{M}') = \sum_{m,t} \gamma_m(t) \log p(o(t), m | \mathcal{M})$$ Eqn 25 where $\gamma_m(t)$ is the posterior probability of component m generating the observation o(t) given the current model parameters $\mathcal{M}$, and M is the new parameter set. After each iteration, the parameter set M' is replaced by the new parameter set M which maximises Q(M, M'). p(o(t), m|M) is a generative model such as a GMM, HMM etc. In the present embodiment a HMM is used which has a state output vector of:

$$P(o(t)|m,s,e,\mathcal{M}) = N(o(t); \hat{\mu}_m^{(s,e)}, \hat{\Sigma}_{v(m)}^{(s,e)})$$ Eqn. 26

Where m∈{1, ..., MN}, t∈{1, ... T}, s∈{1, ..., S} and e∈{1, ..., E} are indices for component, time, speaking style and expression/emotion respectively and where MN, T, S and E are the total number of components, frames, speaking styles and expressions respectively.

The exact form of $\hat{\mu}_m^{(s,e)}$ and $\hat{\Sigma}^{(s,e)}_m$ depends on the type of speaking style and emotion dependent transforms that are applied. In the most general way the style dependent transforms includes:
 a set of style-emotion dependent weights $\lambda_{q(m)}^{(s,e)}$
 a style-emotion-dependent cluster $\mu_{c(m,x)}^{(s,e)}$
 a set of linear transforms $[A_{r(m)}^{(s,e)}, b_{r(m)}^{(s,e)}]$ whereby these transform could depend just on the style, just on the emotion or on both.

After applying all the possible style dependent transforms, the mean vector $\hat{\mu}_m^{(s,e)}$ and covariance matrix $\hat{\Sigma}_m^{(s,e)}$ of the probability distribution m for style s and emotion e become $$\overline{\mu}_m^{(s,e)} = A_{r(m)}^{(s,e)-1}\left(\sum_i \lambda_i^{(s,e)} \mu_{c(m,i)} + (\mu_{c(m,x)}^{(s,e)} - b_{r(m)}^{(s,e)})\right)$$ Eqn 27

$$\overline{\Sigma}_m^{(s,e)} = \left(A_{r(m)}^{(s,e)T} \sum_{v(m)}^{-1} A_{r(m)}^{(s,e)}\right)^{-1}$$ Eqn 28 where $\mu_{c(m,i)}$ are the means of cluster/for component m, $\mu_{c(m,x)}^{(s,e)}$ is the mean vector for component m of the additional cluster for style s emotion e, which will be described later, and $A_{r(m)}^{(s,e)}$ and $b_{r(m)}^{(s,e)}$ are the linear transformation matrix and the bias vector associated with regression class r(m) for the style s, expression e.

R is the total number of regression classes and), $r_{(m)} \in \{1, ..., R\}$ denotes the regression class to which the component m belongs.

If no linear transformation is applied $A_{r(m)}^{(s,e)}$ and $b_{r(m)}^{(s,e)}$ become an identity matrix and zero vector respectively.

For reasons which will be explained later, in this embodiment, the covariances are clustered and arranged into decision trees where v(m)∈{1, ... V} denotes the leaf node in a covariance decision tree to which the co-variance matrix of the component m belongs and V is the total number of variance decision tree leaf nodes.

Using the above, the auxiliary function can be expressed as:

$$Q(\mathcal{M}, \mathcal{M}') =$$ Eqn 29
$$-\frac{1}{2}\sum_{m,t,s} \gamma_m(t)\left\{\log|\overline{\Sigma}_{v(m)}| + (o(t) - \overline{\mu}_m^{(s,e)})^T \overline{\Sigma}_{v(m)}^{-1}(o(t) - \overline{\mu}_m^{(s,e)})\right\} + C$$

where C is a constant independent of M

Thus, using the above and substituting equations 27 and 28 in equation 29, the auxiliary function shows that the model parameters may be split into four distinct parts.

The first part are the parameters of the canonical model i.e. style and expression independent means $\{\mu_n\}$ and the style and expression independent covariance $\{\Sigma_k\}$ the above indices n and k indicate leaf nodes of the mean and variance decision trees which will be described later. The second part are the style-expression dependent weights $\{\lambda_i^{(s,e)}\}_{s,e,i}$ where s indicates speaking style, e indicates expression and i the cluster index parameter. The third part are the means of the style-expression dependent cluster $\mu_{c(m,x)}$ and the fourth part are the CMLLR constrained maximum likelihood linear regression transforms $\{A_d^{(s,e)}, b_d^{(s,e)}\}_{s,e,d}$ where s indicates style, e expression and d indicates component or style-emotion regression class to which component m belongs.

Once the auxiliary function is expressed in the above manner, it is then maximized with respect to each of the variables in turn in order to obtain the ML values of the style and emotion/expression characteristic parameters, the style dependent parameters and the expression/emotion dependent parameters.

In detail, for determining the ML estimate of the mean, the following procedure is performed:

To simplify the following equations it is assumed that no linear transform is applied. If a linear transform is applied, the original observation vectors $\{o_r(t)\}$ have to be substituted by the transform ones $$\{\hat{o}_{r(m)}^{(s,e)}(t) = A_{r(m)}^{(s,e)} o(t) + b_{r(m)}^{(s,e)}\}$$ Eqn. 19

Similarly, it will be assumed that there is no additional cluster. The inclusion of that extra cluster during the training is just equivalent to adding a linear transform on which $A_{r(m)}^{(s,e)}$ is the identity matrix and $\{b_{r(m)}^{(s,e)} = \mu_{c(m,x)}^{(s,e)}\}$ First, the auxiliary function of equation 29 is differentiated with respect to $\mu_n$ as follows:

$$\frac{\partial \mathcal{Q}(\mathcal{M};\hat{\mathcal{M}})}{\partial \mu_n} = k_n - G_{nn}\mu_n - \sum_{v \neq n} G_{nv}\mu_v \quad \text{Eqn. 31}$$

Where $$G_{nv} = \sum_{\substack{m,i,j \\ c(m,i)=n \\ c(m,j)=v}} G_{ij}^{(m)}, \quad k_n = \sum_{\substack{m,i \\ c(m,i)=n}} k_i^{(m)}. \quad \text{Eqn. 32}$$

with $G_{ij}^{(m)}$ and $k_i^{(m)}$ accumulated statistics $$G_{ij}^{(m)} = \sum_{t,s,e} \gamma_m(t,s,e) \lambda_{i,q(m)}^{(s,e)} \Sigma_{v(m)}^{-1} \lambda_{j,q(m)}^{(s,e)} \quad \text{Eqn. 33}$$

$$k_i^{(m)} = \sum_{t,s,e} \gamma_m(t,s,e) \lambda_{i,q(m)}^{(s,e)} \Sigma_{v(m)}^{-1} o(t).$$

By maximizing the equation in the normal way by setting the derivative to zero, the following formula is achieved for the ML estimate of $\mu_n$ i.e. $\hat{\mu}_n$:

$$\hat{\mu}_n = G_{nn}^{-1}\left(k_n - \sum_{v \neq n} G_{nv}\mu_v\right) \quad \text{Eqn. 34}$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix}, \quad \text{Eqn. 35}$$

However, if the training data is small or N is quite large, the coefficient matrix of equation 35 cannot have full rank. This problem can be avoided by using singular value decomposition or other well-known matrix factorization techniques.

The same process is then performed in order to perform an ML estimate of the covariances i.e. the auxiliary function shown in equation 29 is differentiated with respect to $\Sigma_k$ to give:

$$\hat{\Sigma}_k = \frac{\sum_{\substack{t,s,e,m \\ v(m)=k}} \gamma_m(t,s,e) \bar{o}_{q(m)}^{(s,e)}(t) \bar{o}_{q(m)}^{(s,e)}(t)^T}{\sum_{\substack{t,s,e,m \\ v(m)=k}} \gamma_m(t,s,e)} \quad \text{Eqn. 36}$$

Where $$\bar{o}_{q(m)}^{(s,e)}(t) = o(t) - M_m \lambda_q^{(s,e)} \quad \text{Eqn. 37}$$

The ML estimate for style dependent weights and the style dependent linear transform can also be obtained in the same manner i.e. differentiating the auxiliary function with respect to the parameter for which the ML estimate is required and then setting the value of the differential to 0.

For the expression/emotion dependent weights this yields $$\lambda_q^{(e)} = \left(\sum_{\substack{t,m,s \\ q(m)=q}} \gamma_m(t,s,e) M_m^{(e)T} \Sigma_{v(m)}^{-1} M_m^{(e)}\right)^{-1} \quad \text{Eqn. 38}$$

$$\sum_{\substack{t,m,s \\ q(m)=q}} \gamma_m(t,s,e) M_m^{(e)T} \Sigma_{v(m)}^{-1} \hat{o}_{q(m)}^{(s)}(t)$$

Where $$\hat{o}_{q(m)}^{(s)}(t) = o(t) - \mu_{c(m,1)} - M_m^{(s)} \lambda_q^{(s)}$$

And similarly, for the style-dependent weights $$\lambda_q^{(s)} = \left(\sum_{\substack{t,m,e \\ q(m)=q}} \gamma_m(t,s,e) M_m^{(s)T} \Sigma_{v(m)}^{-1} M_m^{(s)}\right)^{-1} \sum_{\substack{t,m,e \\ q(m)=q}} \gamma_m(t,s,e) M_m^{(s)T} \Sigma_{v(m)}^{-1} \hat{o}_{q(m)}^{(e)}(t)$$

Where $$\hat{o}_{q(m)}^{(e)}(t) = o(t) - \mu_{c(m,1)} - M_m^{(e)} \lambda_q^{(e)}$$

In a preferred embodiment, the process is performed in an iterative manner. This basic system is explained with reference to the flow diagrams of FIGS. 13 to 15.

In step S401, a plurality of inputs of audio and video are received. In this illustrative example, 4 styles are used.

Next, in step S403, an acoustic model is trained and produced for each of the 4 voices/styles, each speaking with neutral emotion. In this embodiment, each of the 4 models is only trained using data with one speaking style. S403 will be explained in more detail with reference to the flow chart of FIG. 14.

Figure 14:
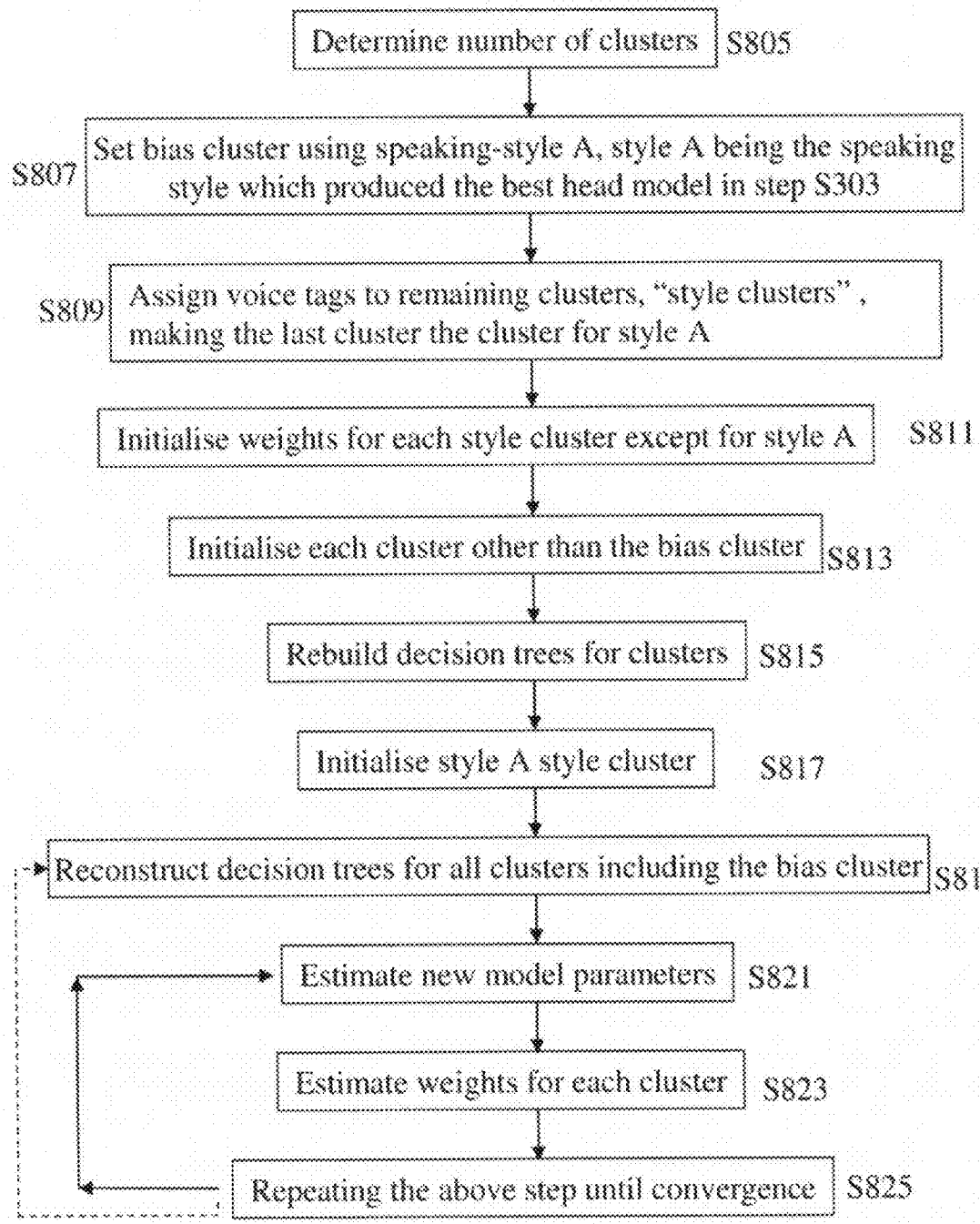
FIG. 14 is a flow diagram showing in detail the sub-steps of one of the steps of the flow diagram of FIG. 13.
Figure 15:
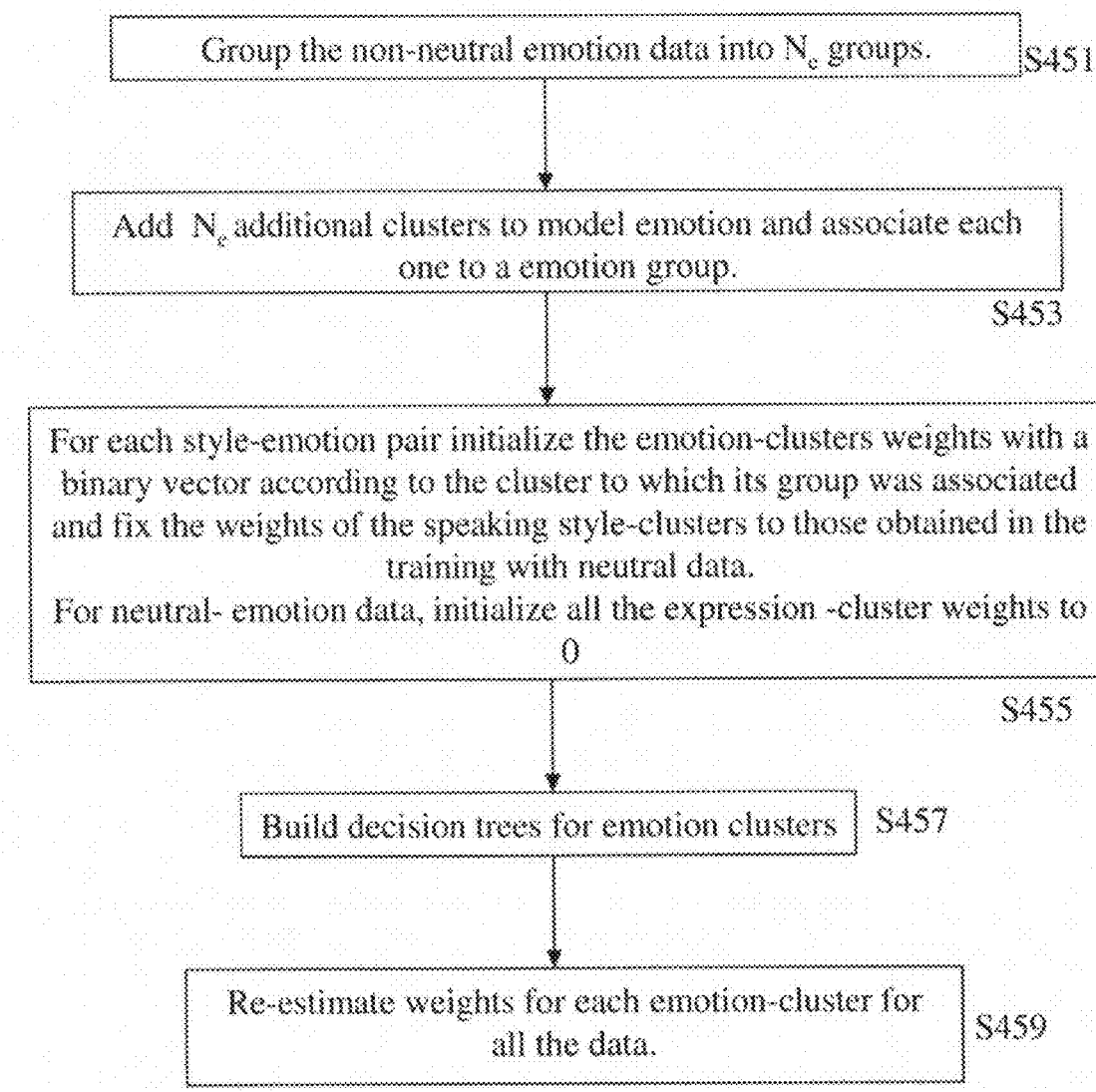
FIG. 15 is a flow diagram showing in detail the sub-steps of one of the steps of the flow diagram of FIG. 13.

In step S805 of FIG. 14, the number of clusters P is set to V+1, where V is the number of voices (4).

In step S807, one cluster (cluster 1), is determined as the bias cluster. The decision trees for the bias cluster and the associated cluster mean vectors are initialised using the voice which in step S303 produced the best model. In this example, each voice is given a tag "Style A", "Style B", "Style C" and "Style D", here Style A is assumed to have produced the best model. The covariance matrices, space weights for multi-space probability distributions (MSD) and their parameter sharing structure are also initialised to those of the Style A model.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data as explained above with reference to FIGS. 9 to 12.

Decision trees might be also constructed for variance as explained above.

In step S809, a specific voice tag is assigned to each of 2, . . . , P clusters e.g. clusters 2, 3, 4, and 5 are for styles B, C, D and A respectively. Note, because Style A was used to initialise the bias cluster it is assigned to the last cluster to be initialised.

In step S811, a set of CAT interpolation weights are simply set to 1 or 0 according to the assigned voice tag as:

$$\lambda_i^{(s)} = \begin{cases} 1.0 & \text{if } i = 0 \\ 1.0 & \text{if } voicetag(s) = i \\ 0.0 & \text{otherwise} \end{cases}$$

In this embodiment, there are global weights per style, per stream.

In step S813, for each cluster 2, . . . , (P−1) in turn the clusters are initialised as follows. The voice data for the associated style, e.g. style B for cluster 2, is aligned using the mono-style model for the associated style trained in step S303. Given these alignments, the statistics are computed and the decision tree and mean values for the cluster are estimated. The mean values for the cluster are computed as the normalised weighted sum of the cluster means using the weights set in step S811 i.e. in practice this results in the mean values for a given context being the weighted sum (weight 1 in both cases) of the bias cluster mean for that context and the style B model mean for that context in cluster 2.

In step S815, the decision trees are then rebuilt for the bias cluster using all the data from all 4 styles, and associated means and variance parameters re-estimated.

After adding the clusters for styles B, C and D the bias cluster is re-estimated using all 4 styles at the same time.

In step S817, Cluster P (style A) is now initialised as for the other clusters, described in step S813, using data only from style A.

Once the clusters have been initialised as above, the CAT model is then updated/trained as follows:

In step S819 the decision trees are re-constructed cluster-by-cluster from cluster 1 to P, keeping the CAT weights fixed. In step S821, new means and variances are estimated in the CAT model. Next in step S823, new CAT weights are estimated for each cluster. In an embodiment, the process loops back to S821 until convergence. The parameters and weights are estimated using maximum likelihood calculations performed by using the auxiliary function of the Baum-Welch algorithm to obtain a better estimate of said parameters.

As previously described, the parameters are estimated via an iterative process.

In a further embodiment, at step S823, the process loops back to step S819 so that the decision trees are reconstructed during each iteration until convergence.

Figure 13:
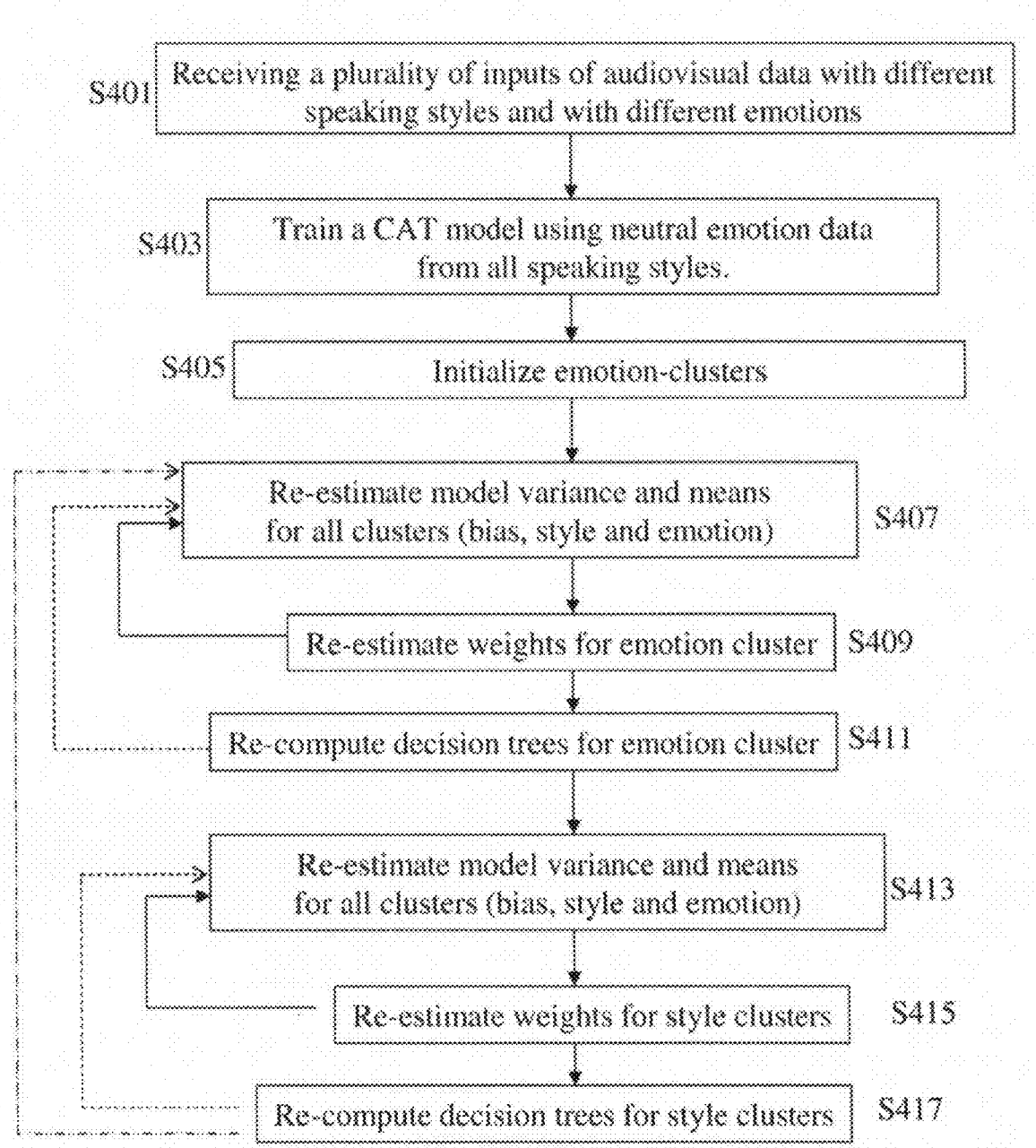
FIG. 13 is a flow diagram showing the training of a system for a head generation system where the weightings are factorised.

The process then returns to step S405 of FIG. 13 where the model is then trained for different emotion both vocal and facial.

In this embodiment, emotion is modelled using cluster adaptive training in the same manner as described for modelling the speaking style in step S403. First, "emotion clusters" are initialised in step S405. This will be explained in more detail with reference to FIG. 15.

Data is then collected for at least one of the styles where in addition the input data is emotional either in terms of the facial expression or the voice. It is possible to collect data from just one style, where the speaker provides a number of data samples in that style, each exhibiting a different emotions or the speaker providing a plurality of styles and data samples with different emotions. In this embodiment, it will be presumed that the speech samples provided to train the system to exhibit emotion come from the style used to collect the data to train the initial CAT model in step S403. However, the system can also train to exhibit emotion using data collected with different speaking styles for which data was not used in S403.

In step S451, the non-Neutral emotion data is then grouped into $N_e$ groups. In step S453, $N_e$ additional clusters are added to model emotion. A cluster is associated with each emotion group. For example, a cluster is associated with "Happy", etc.

These emotion clusters are provided in addition to the neutral style clusters formed in step S403.

In step S455, initialise a binary vector for the emotion cluster weighting such that if speech data is to be used for training exhibiting one emotion, the cluster is associated with that emotion is set to "1" and all other emotion clusters are weighted at "0".

During this initialisation phase the neutral emotion speaking style clusters are set to the weightings associated with the speaking style for the data.

Next, the decision trees are built for each emotion cluster in step S457. Finally, the weights are re-estimated based on all of the data in step S459.

After the emotion clusters have been initialised as explained above, the Gaussian means and variances are re-estimated for all clusters, bias, style and emotion in step S407.

Next, the weights for the emotion clusters are re-estimated as described above in step S409. The decision trees are then re-computed in step S411. Next, the process loops back to step S407 and the model parameters, followed by the weightings in step S409, followed by reconstructing the decision trees in step S411 are performed until convergence. In an embodiment, the loop S407-S409 is repeated several times.

Next, in step S413, the model variance and means are re-estimated for all clusters, bias, styles and emotion. In step S415 the weights are re-estimated for the speaking style clusters and the decision trees are rebuilt in step S417. The process then loops back to step S413 and this loop is repeated until convergence. Then the process loops back to step S407 and the loop concerning emotions is repeated until converge. The process continues until convergence is reached for both loops jointly.

Figure 16:
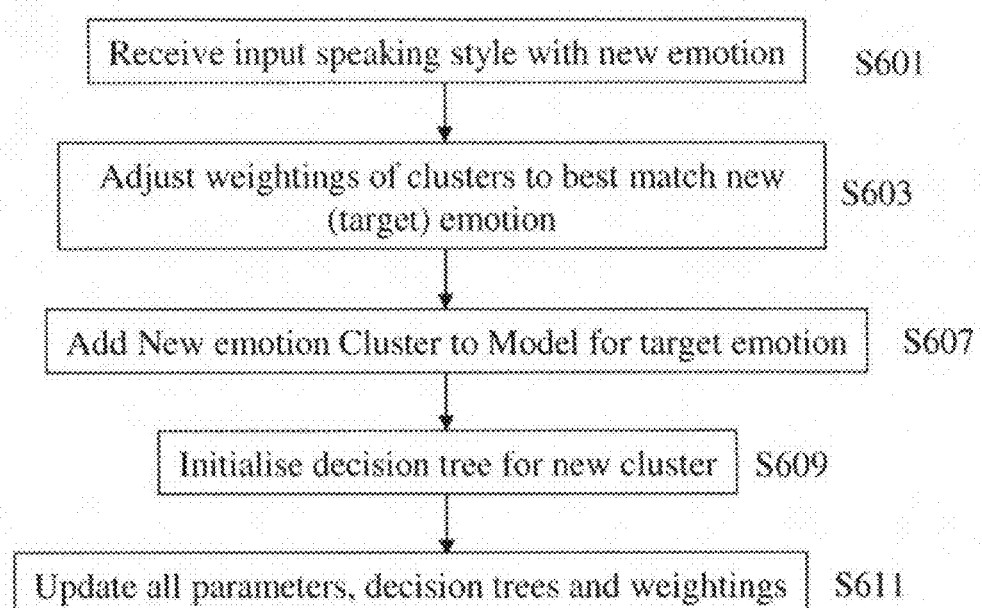
FIG. 16 is a flow diagram showing the adaptation of the system described with reference to FIG. 13.

In a further embodiment, the system is used to adapt to a new attribute such as a new emotion. This will be described with reference to FIG. 16.

First, a target voice is received in step S601, the data is collected for the voice speaking with the new attribute. First, the weightings for the neutral style clusters are adjusted to best match the target voice in step S603.

Then, a new emotion cluster is added to the existing emotion clusters for the new emotion in step S607. Next, the decision tree for the new cluster is initialised as described with relation to FIG. 12 from step S455 onwards. The weightings, model parameters and trees are then re-estimated and rebuilt for all clusters as described with reference to FIG. 13.

The above methods demonstrate a system which allows a computer generated head to output speech in a natural manner as the head can adopt and adapt to different expressions. The clustered form of the data allows a system to be built with a small footprint as the data to run the system is stored in a very efficient manner, also the system can easily adapt to new expressions as described above while requiring a relatively small amount of data.

The above has explained in detail how CAT-HMM is applied to render and animate the head. As explained above, the face vector is comprised of a plurality of face parameters. One suitable model for supporting a vector is an active appearance model (AAM). Although other statistical models may be used.

An AAM is defined on a mesh of V vertices. The shape of the model, $s=(x_1; y_1; x_2; y_2; :X_V; y_V)^T$ defines the 2D position $(x_i; y_i)$ of each mesh vertex and is a linear model given by:

$$s = s_0 + \sum_{i=1}^{M} c_i s_i,$$  Eqn. 2.1 where $s_0$ is the mean shape of the model, $s_i$ is the $i^{th}$ mode of M linear shape modes and $c_i$ is its corresponding parameter which can be considered to be a "weighting parameter". The shape modes and how they are trained will be described in more detail with reference to FIG. 19. However, the shape modes can be thought of as a set of facial expressions. A shape for the face may be generated by a weighted sum of the shape modes where the weighting is provided by parameter $c_i$.

By defining the outputted expression in this manner it is possible for the face to express a continuum of expressions.

Colour values are then included in the appearance of the model, by $a=(r_1; g_1; b_1; r_2; g_2; b_2; \ldots :r_P; g_P; b_P)^T$ where $(r_i; g_i; b_i)$ is the RGB representation of the $i^{th}$ of the P pixels which project into the mean shape $s_0$. Analogous to the shape model, the appearance is given by:

$$a = a_0 + \sum_{i=1}^{M} c_i a_i,$$  Eqn. 2.2 where $a_0$ is the mean appearance vector of the model, and $a_i$ is the $i^{th}$ appearance mode.

In this embodiment, a combined appearance model is used and the parameters $c_i$ in equations 2.1 and 2.1 are the same and control both shape and appearance.

Figure 17:
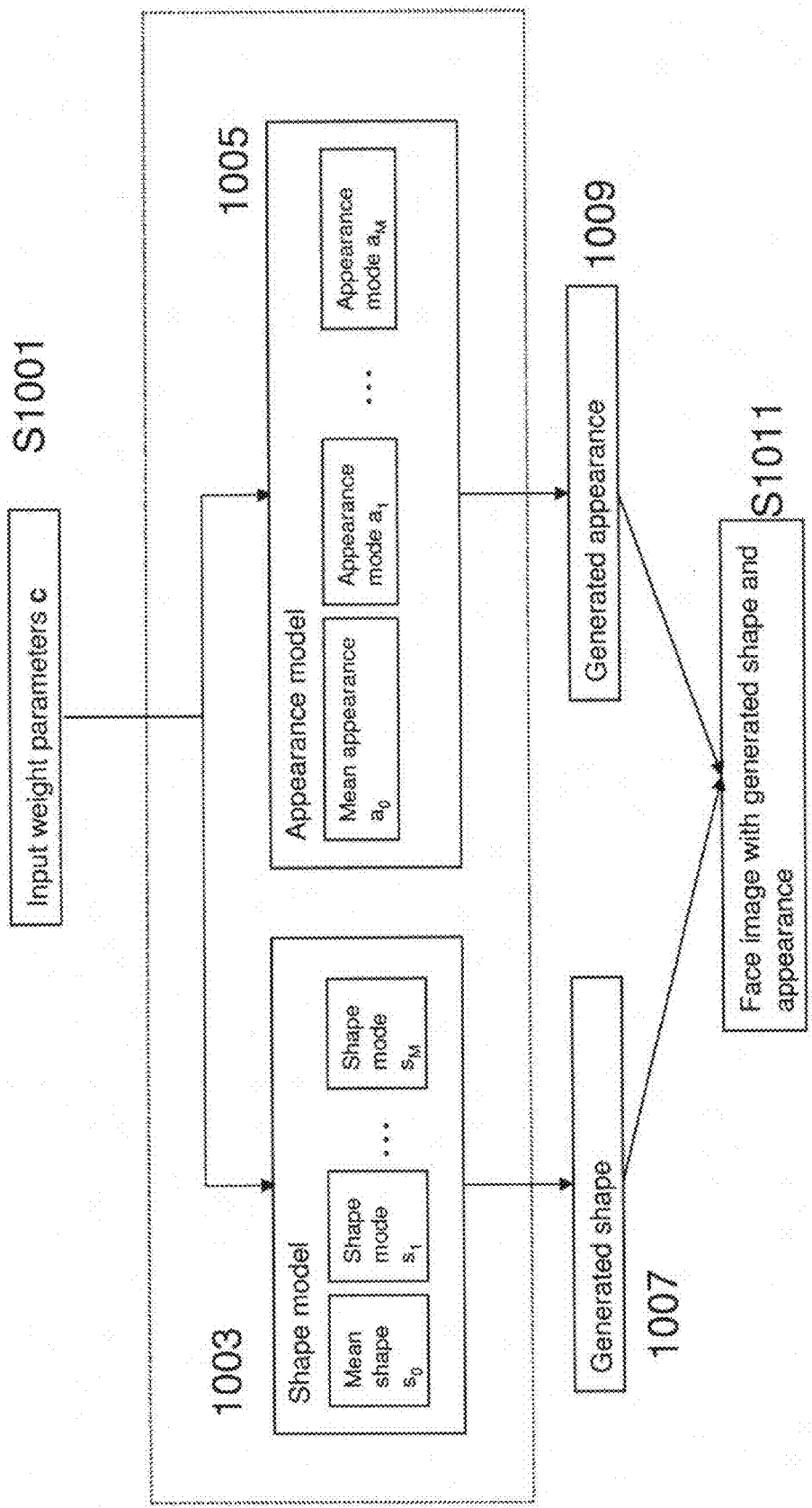
FIG. 17 is an image model which can be used with method and systems in accordance with embodiments of the present invention.

FIG. 17 shows a schematic of such an AAM. Input into the model are the parameters in step S1001. These weights are then directed into both the shape model 1003 and the appearance model 1005.

FIG. 17 demonstrates the modes $s_0, s_1 \ldots s_M$ of the shape model 1003 and the modes $a_0, a_1 \ldots a_M$ of the appearance model. The output 1007 of the shape model 1003 and the output 1009 of the appearance model are combined in step S1011 to produce the desired face image.

The parameters which are input into this model can be used as the face vector referred to above in the description accompanying FIG. 2 above.

The global nature of AAMs leads to some of the modes handling variations which are due to both 3D pose change as well as local deformation.

In this embodiment AAM modes are used which correspond purely to head rotation or to other physically meaningful motions. This can be expressed mathematically as:

$$s = s_0 + \sum_{i=1}^{K} c_i s_i^{pose} + \sum_{i=K+1}^{M} c_i s_i^{deform}.$$  Eqn. 2.3

In this embodiment, a similar expression is also derived for appearance. However, the coupling of shape and appearance in AAMs makes this a difficult problem. To address this, during training, first the shape components are derived which model $\{s_i^{pose}\}_{i=1}^{K}$, by recording a short training sequence of head rotation with a fixed neutral expression and applying PCA to the observed mean normalized shapes $\hat{s}=s-s_0$. Next $\hat{s}$ is projected into the pose variation space spanned by $\{s_i^{pose}\}_{i=1}^{K}$ to estimate the parameters $\{c_i\}_{i=1}^{K}$ in equation 2.3 above:

$$c_i = \frac{\hat{s}^T s_i^{pose}}{\|s_i^{pose}\|^2}.$$  Eqn. 2.4

Having found these parameters the pose component is removed from each training shape to obtain a pose normalized training shape $s^*$:

$$s^* = \hat{s} - \sum_{i=1}^{K} c_i s_i^{pose}.$$  Eqn. 2.5

If shape and appearance were indeed independent then the deformation components could be found using principal component analysis (PCA) of a training set of shape samples normalized as in equation 2.5, ensuring that only modes orthogonal to the pose modes are found.

However, there is no guarantee that the parameters calculated using equation (2.4 are the same for the shape and appearance modes, which means that it may not be possible to reconstruct training examples using the model derived from them.

To overcome this problem the mean of each $\{c_i\}_{i=1}^{K}$ of the appearance and shape parameters is computed using:

$$c_i = \frac{1}{2}\left(\frac{\hat{s}^T s_i^{pose}}{\|s_i^{pose}\|^2} + \frac{\hat{a}^T a_i^{pose}}{\|a_i^{pose}\|^2}\right).$$  Eqn. 2.6

The model is then constructed by using these parameters in equation 2.5 and finding the deformation modes from samples of the complete training set.

In further embodiments, the model is adapted for accommodate local deformations such as eye blinking. This can be achieved by a modified version of the method described in which model blinking are learned from a video containing blinking with no other head motion.

Directly applying the method taught above for isolating pose to remove these blinking modes from the training set may introduce artifacts. The reason for this is apparent when considering the shape mode associated with blinking in which the majority of the movement is in the eyelid. This means that if the eyes are in a different position relative to the centroid of the face (for example if the mouth is open, lowering the centroid) then the eyelid is moved toward the mean eyelid position, even if this artificially opens or closes the eye. Instead of computing the parameters of absolute coordinates in equation 2.6, relative shape coordinates are implemented using a Laplacian operator:

$$c_i^{blink} = \frac{1}{2}\left(\frac{L(\hat{s})^T L(s_i^{blink})}{\|L(s_i^{blink})\|^2} + \frac{\hat{a}^T a_i^{blink}}{\|a_i^{blink}\|^2}\right).$$ Eqn. 2.7

The Laplacian operator $L(\ )$ is defined on a shape sample such that the relative position, $\delta_i$ of each vertex i within the shape can be calculated from its original position $p_i$ using $$\delta_i = \sum_{j \in N} \frac{p_i - p_j}{\|d_{ij}\|^2},$$ Eqn. 2.8 where N is a one-neighbourhood defined on the AAM mesh and $d_{ij}$ is the distance between vertices i and j in the mean shape. This approach correctly normalizes the training samples for blinking, as relative motion within the eye is modelled instead of the position of the eye within the face.

Further embodiments also accommodate for the fact that different regions of the face can be moved nearly independently. It has been explained above that the modes are decomposed into pose and deformation components. This allows further separation of the deformation components according to the local region they affect. The model can be split into R regions and its shape can be modelled according to:

$$s = s_0 + \sum_{i=1}^{K} c_i s_i^{pose} + \sum_{j=1}^{R} \sum_{i \in I_j} c_i s_i^j,$$ Eqn. 2.9 where $I_j$ is the set of component indices associated with region j. In one embodiment, modes for each region are learned by only considering a subset of the model's vertices according to manually selected boundaries marked in the mean shape. Modes are iteratively included up to a maximum number, by greedily adding the mode corresponding to the region which allows the model to represent the greatest proportion of the observed variance in the training set.

An analogous model is used for appearance. Linearly blending is applied locally near the region boundaries. This approach is used to split the face into an upper and lower half. The advantage of this is that changes in mouth shape during synthesis cannot lead to artefacts in the upper half of the face. Since global modes are used to model pose there is no risk of the upper and lower halves of the face having a different pose.

Figure 18A:
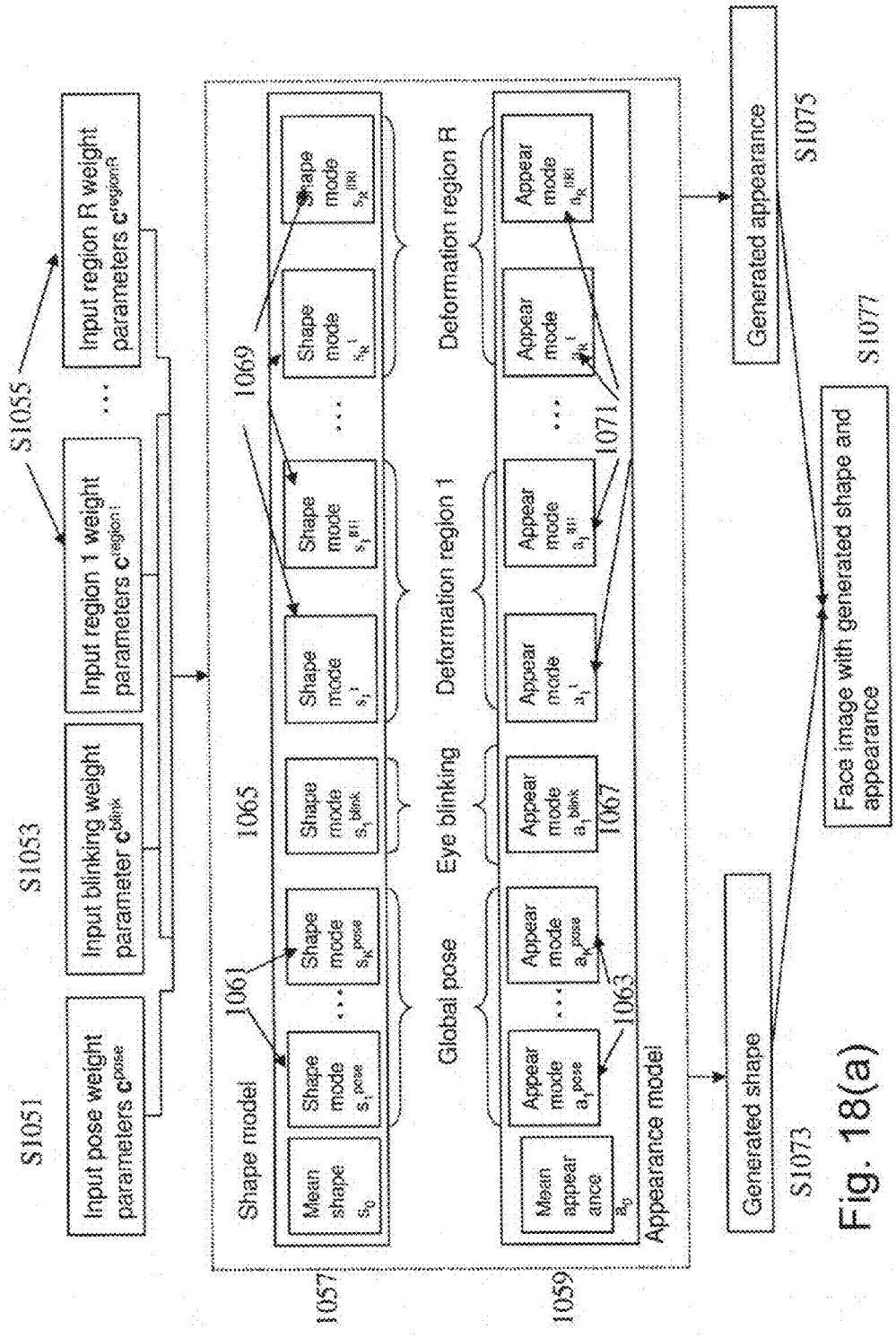
FIG. 18(a) is a variation on the model of FIG. 17.

FIG. 18 demonstrates the enhanced AAM as described above. As for the AAM of FIG. 17, the input weightings for the AAM of FIG. 18(a) can form a face vector to be used in the algorithm described with reference to FIG. 2.

However, here the input parameters ci are divided into parameters for pose which are input at S1051, parameters for blinking S1053 and parameters to model deformation in each region as input at S1055. In FIG. 18, regions 1 to R are shown.

Next, these parameters are fed into the shape model 1057 and appearance model 1059. Here:

the pose parameters are used to weight the pose modes 1061 of the shape model 1057 and the pose modes 1063 of the appearance model;

the blink parameters are used to weight the blink mode 1065 of the shape model 1057 and the blink mode 1067 of the appearance model; and the regional deformation parameters are used to weight the regional deformation modes 1069 of the shape model 1057 and the regional deformation modes 1071 of the appearance model.

As for FIG. 17, a generated shape is output in step S1073 and a generated appearance is output in step S1075. The generated shape and generated appearance are then combined in step S1077 to produce the generated image.

Since the teeth and tongue are occluded in many of the training examples, the synthesis of these regions may cause significant artefacts. To reduce these artefacts a fixed shape and texture for the upper and lower teeth is used. The displacements of these static textures are given by the displacement of a vertex at the centre of the upper and lower teeth respectively. The teeth are rendered before the rest of the face, ensuring that the correct occlusions occur.

Figure 18B:
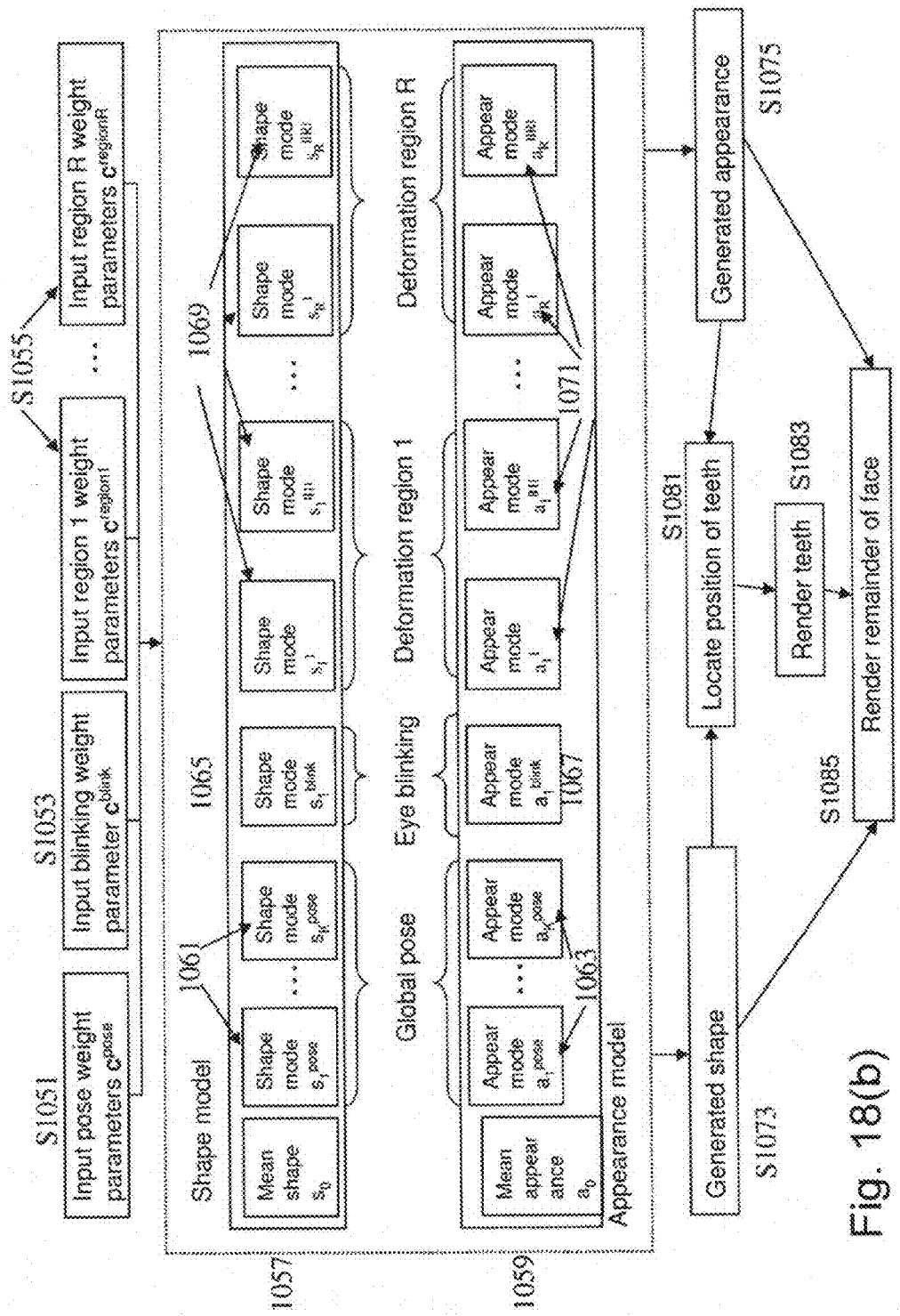
FIG. 18(b) is a variation on the model of FIG. 18(a)

FIG. 18(b) shows an amendment to FIG. 18(a) where the static artefacts are rendered first. After the shape and appearance have been generated in steps S1073 and S1075 respectively, the position of the teeth are determined in step S1081. In an embodiment, the teeth are determined to be at a position which is relative to a fixed visible point on the face. The teeth are then rendered by assuming a fixed shape and texture for the teeth in step S1083. Next the rest of the face is rendered in step S1085.

Figure 19:
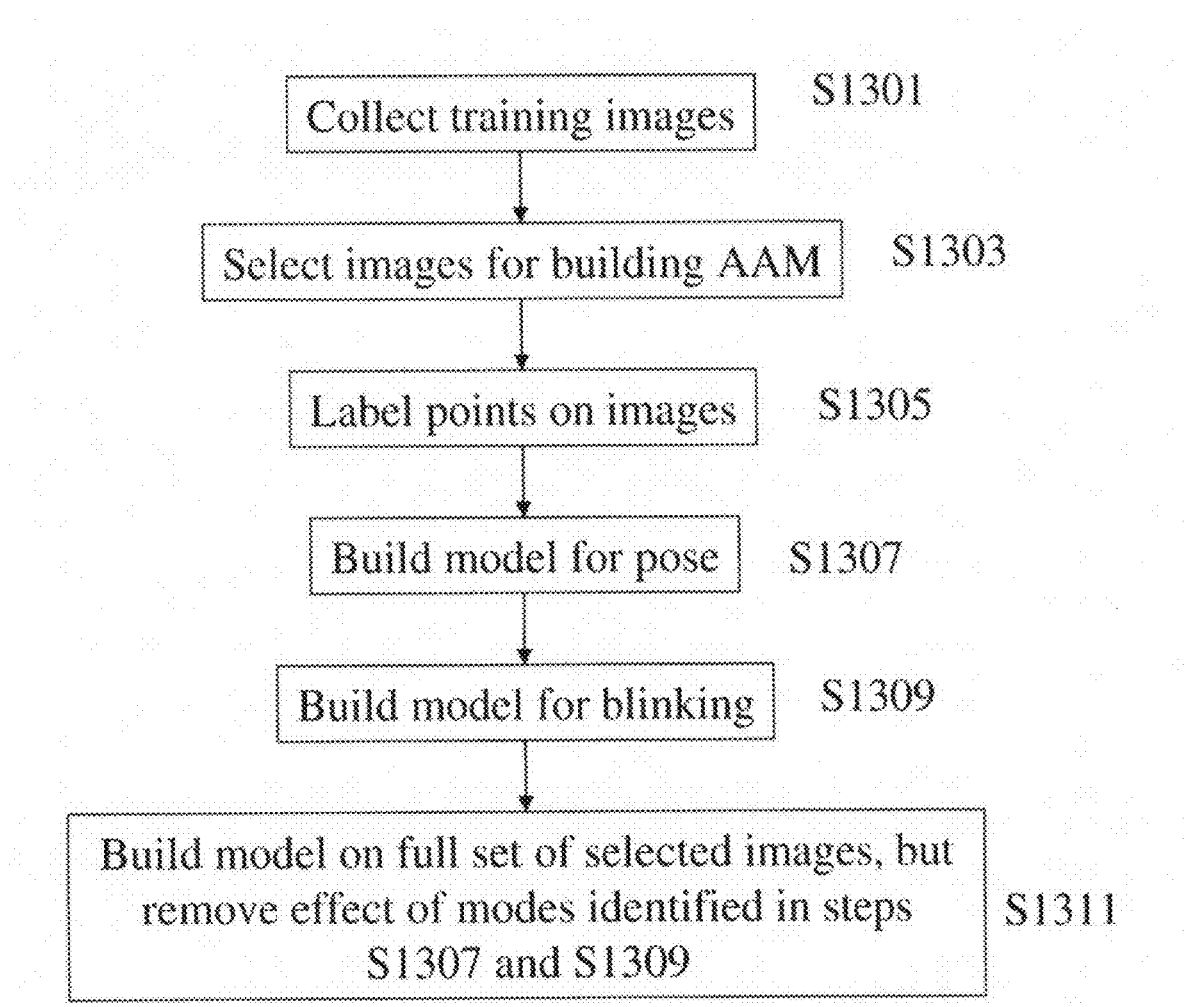
FIG. 19 is a flow diagram showing the training of the model of FIGS. 18(a) and (b)

FIG. 19 is a flow diagram showing the training of the system in accordance with an embodiment of the present invention. Training images are collected in step S1301. In one embodiment, the training images are collected covering a range of expressions. For example, audio and visual data may be collected by using cameras arranged to collect the speaker's facial expression and microphones to collect audio. The speaker can read out sentences and will receive instructions on the emotion or expression which needs to be used when reading a particular sentence.

The data is selected so that it is possible to select a set of frames from the training images which correspond to a set of common phonemes in each of the emotions. In some embodiments, about 7000 training sentences are used. However, much of this data is used to train the speech model to produce the speech vector as previously described.

In addition to the training data described above, further training data is captured to isolate the modes due to pose change. For example, video of the speaker rotating their head may be captured while keeping a fixed neutral expression.

Also, video is captured of the speaker blinking while keeping the rest of their face still.

In step S1303, the images for building the AAM are selected. In an embodiment, only about 100 frames are required to build the AAM. The images are selected which allow data to be collected over a range of frames where the speaker exhibits a wide range of emotions. For example, frames may be selected where the speaker demonstrates different expressions such as different mouth shapes, eyes open, closed, wide open etc. In one embodiment, frames are selected which correspond to a set of common phonemes in each of the emotions to be displayed by the head.

In further embodiments, a larger number of frames could be use, for example, all of the frames in a long video sequence. In a yet further embodiment frames may be selected where the speaker has performed a set of facial expressions which roughly correspond to separate groups of muscles being activated.

In step S1305, the points of interest on the frames selected in step S1303 are labelled. In an embodiment this is done by visually identifying key points on the face, for example eye corners, mouth corners and moles or blemishes. Some contours may also be labelled (for example, face and hair silhouette and lips) and key points may be generated automatically from these contours by equidistant subdivision of the contours into points.

In other embodiments, the key points are found automatically using trained key point detectors. In a yet further embodiment, key points are found by aligning multiple face images automatically. In a yet further embodiment, two or more of the above methods can be combined with hand labelling so that a semi-automatic process is provided by inferring some of the missing information from labels supplied by a user during the process.

In step S1307, the frames which were captured to model pose change are selected and an AAM is built to model pose alone.

Next, in step S1309, the frames which were captured to model blinking are selected AAM modes are constructed to mode blinking alone.

Next, a further AAM is built using all of the frames selected including the ones used to model pose and blink, but before building the model, the effect of k modes was removed from the data as described above.

Frames where the AAM has performed poorly are selected. These frames are then hand labelled and added to the training set. The process is repeated until there is little further improvement adding new images.

The AAM has been trained once all AAM parameters for the modes—pose, blinking and deformation have been established.

Figure 20:
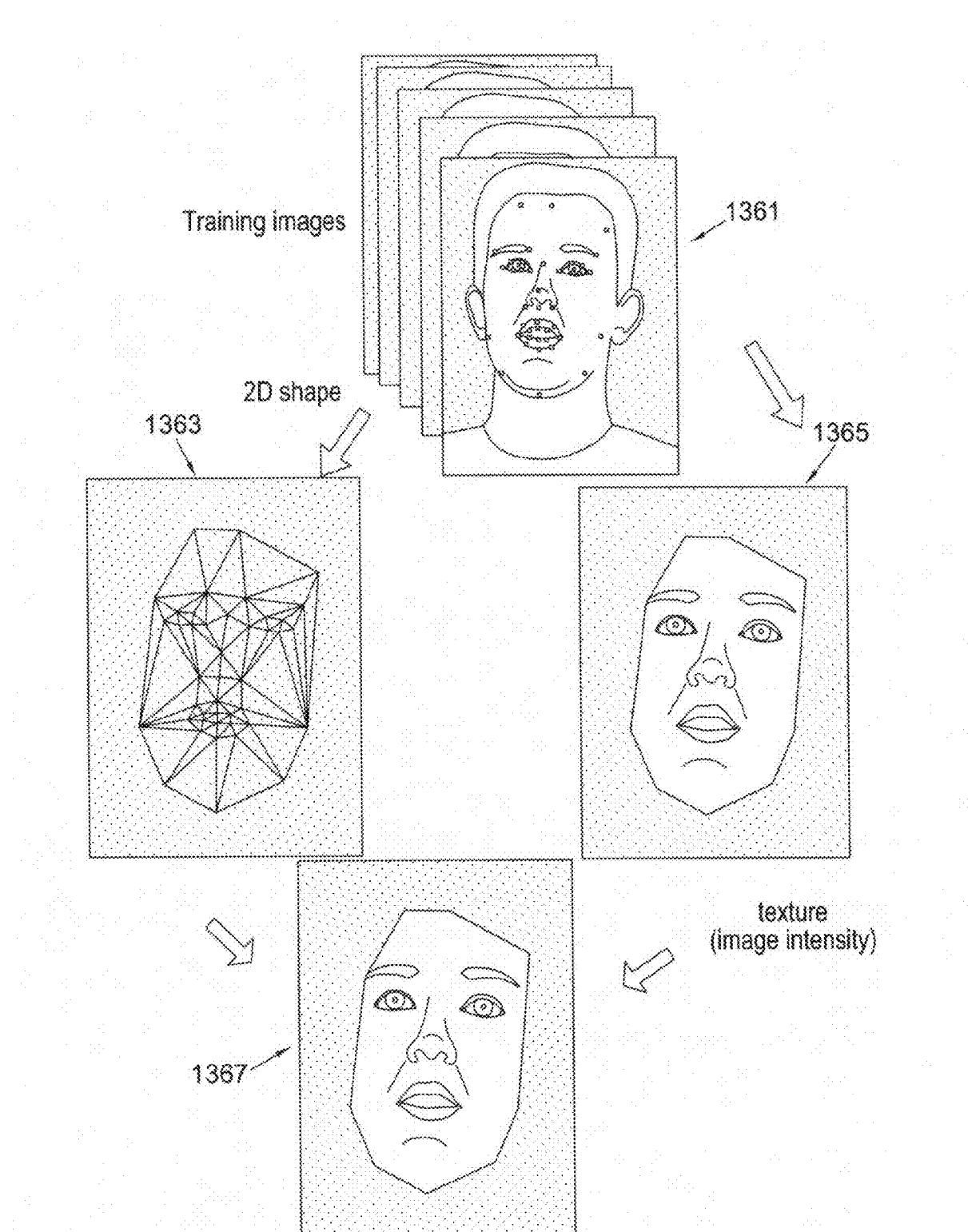
FIG. 20 is a schematic showing the basics of the training described with reference to FIG. 19.

FIG. 20 is a schematic of how the AAM is constructed. The training images 1361 are labelled and a shape model 1363 is derived. The texture 1365 is also extracted for each face model. Once the AAM modes and parameters are calculated as explained above, the shape model 1363 and the texture model 365 are combined to generate the face 1367.

In one embodiment, the AAM parameters and their first time derivates are used at the input for a CAT-HMM training algorithm as previously described.

In a further embodiment, the spatial domain of a previously trained AAM is extended to further domains without affecting the existing model. For example, it may be employed to extend a model that was trained only on the face region to include hair and ear regions in order to add more realism.

A set of N training images for an existing AAM are known, as are the original model coefficient vectors $\{c_j\}_{j=1}^{N}$ $c_j \in R^M$ for these images. The regions to be included in the model are then labelled, resulting in a new set of N training shapes $\{\tilde{s}_j^{ext}\}_{j=1}^{N}$ and appearances $\{\tilde{a}_j^{ext}\}_{j=1}^{N}$. Given the original model with M modes, the new shape modes $\{s_i\}_{i=1}^{M}$, should satisfy the following constraint:

$$\begin{bmatrix} c_1^T \\ \vdots \\ c_N^T \end{bmatrix} \begin{bmatrix} s_1^T \\ \vdots \\ s_M^T \end{bmatrix} = \begin{bmatrix} (\tilde{s}_1^{ext})^T \\ \vdots \\ (\tilde{s}_N^{ext})^T \end{bmatrix}, \quad \text{Eqn. 2.10}$$

which states that the new modes can be combined, using the original model coefficients, to reconstruct the extended training shapes $\tilde{s}_j^{ext}$. Assuming that the number of training samples N is larger than the number of modes M, the new shape modes can be obtained as the least-squares solution. New appearance modes are found analogously.

To illustrate the above, an experiment was conducted. Here, a corpus of 6925 sentences divided between 6 emotions; neutral, tender, angry, afraid, happy and sad was used. From the data 300 sentences were held out as a test set and the remaining data was used to train the speech model. The speech data was parameterized using a standard feature set consisting of 45 dimensional Mel-frequency cepstral coefficients, log-F0 (pitch) and 25 band aperiodicities, together with the first and second time derivatives of these features. The visual data was parameterized using the different AAMs described below. Some AAMs were trained in order to evaluate the improvements obtained with the proposed extensions. In each case the AAM was controlled by 17 parameters and the parameter values and their first time derivatives were used in the CAT model.

The first model used, AAMbase, was built from 71 training images in which 47 facial keypoints were labeled by hand. Additionally, contours around both eyes, the inner and outer lips, and the edge of the face were labeled and points were sampled at uniform intervals along their length. The second model, AAMdecomp, separates both 3D head rotation (modeled by two modes) and blinking (modeled by one mode) from the deformation modes. The third model, AAMregions, is built in the same way as AAMdecomp expect that 8 modes are used to model the lower half of the face and 6 to model the upper half. The final model, AAMfull, is identical to AAMregions except for the mouth region which is modified to handle static shapes differently. In the first experiment the reconstruction error of each AAM was quantitatively evaluated on the complete data set of 6925 sentences which contains approximately 1 million frames. The reconstruction error was measured as the L2 norm of the per-pixel difference between an input image warped onto the mean shape of each AAM and the generated appearance.

Figure 21A:
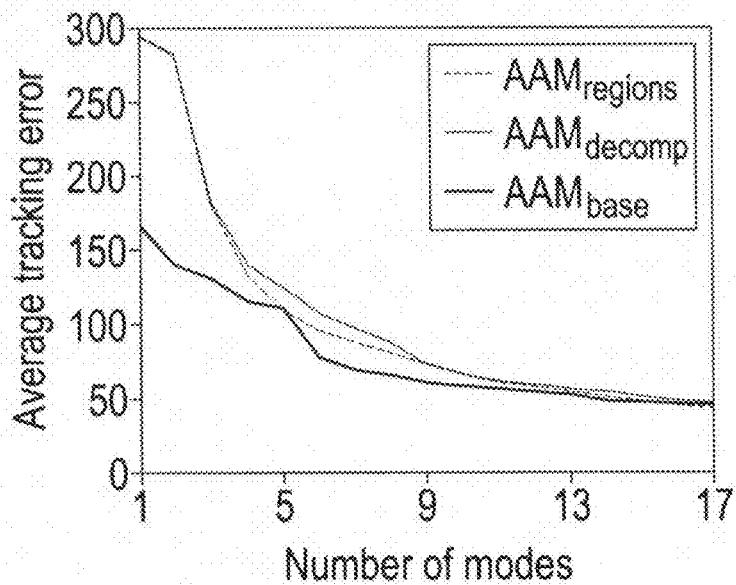
FIG. 21 (a) is a plot of the error against the number of modes used in the image models described with reference to FIGS. 17, 18(a) and (b)
FIG. 21(b) is a plot of the number of sentences used for training against the errors measured in the trained model.
Figure 21B:
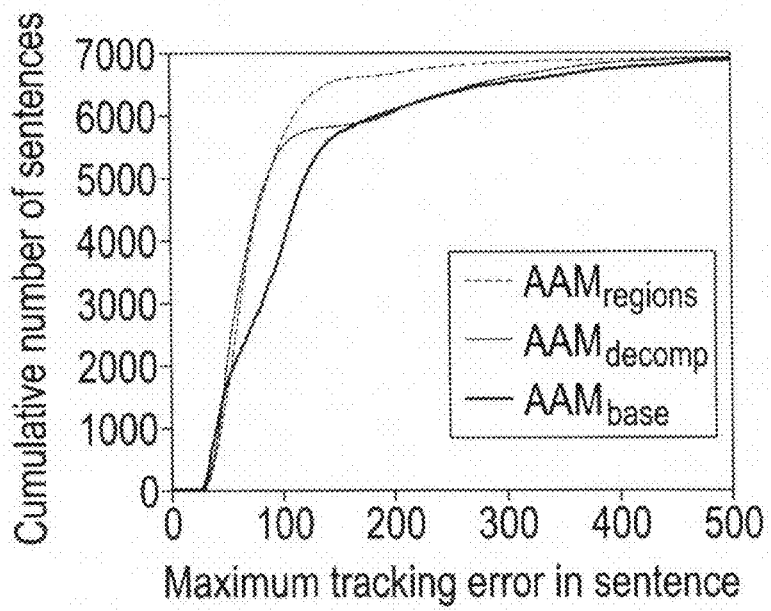

FIG. 21(a) shows how reconstruction errors vary with the number of AAM modes. It can be seen that while with few modes, AAMbase has the lowest reconstruction error, as the number of modes increases the difference in error decreases. In other words, the flexibility that semantically meaningful modes provide does not come at the expense of reduced tracking accuracy. In fact the modified models were found to be more robust than the base model, having a lower worst case error on average, as shown in FIG. 21(b). This is likely due to AAMregions and AAMdecomp being better able to generalize to unseen examples as they do not overfit the training data by learning spurious correlations between different face regions.

A number of large-scale user studies were performed in order to evaluate the perceptual quality of the synthesized videos. The experiments were distributed via a crowd sourcing website, presenting users with videos generated by the proposed system.

In the first study the ability of the proposed VTTS system to express a range of emotions was evaluated. Users were presented either with video or audio clips of a single sentence from the test set and were asked to identify the emotion expressed by the speaker, selecting from a list of six emotions. The synthetic video data for this evaluation was generated using the AAMregions model. It is also compared with versions of synthetic video only and synthetic audio only, as well as cropped versions of the actual video footage. In each case 10 sentences in each of the six emotions were evaluated by 20 people, resulting in a total sample size of 1200.

Figure 22:
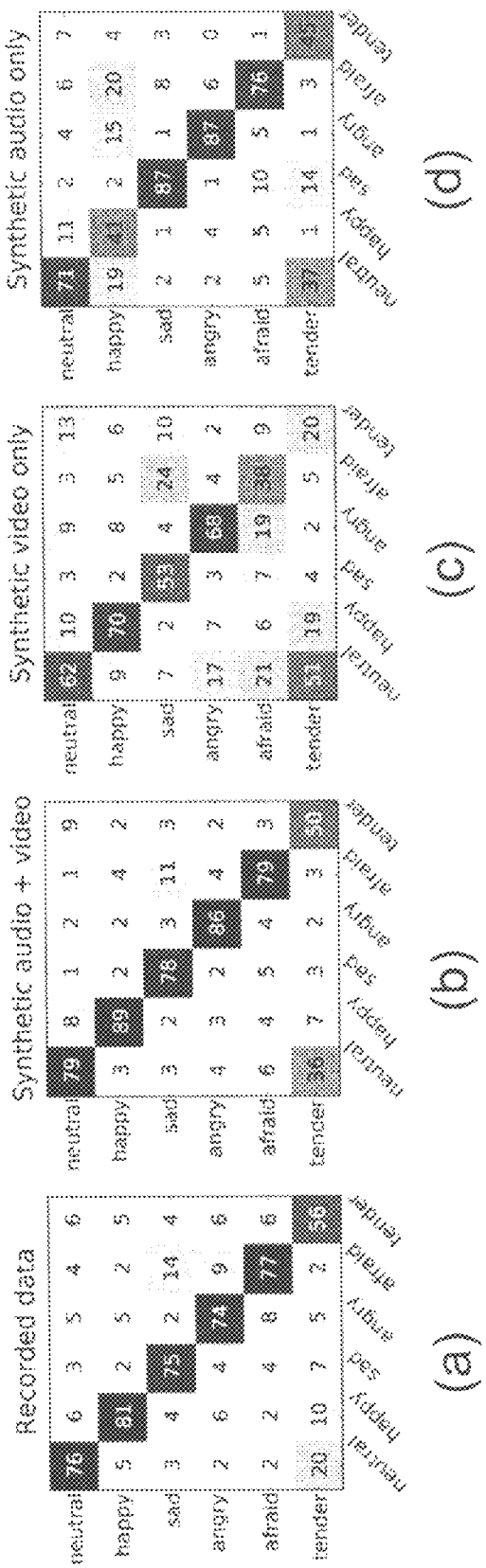

The average recognition rates are 73% for the captured footage, 77% for our generated video (with audio), 52% for the synthetic video only and 68% for the synthetic audio only. These results indicate that the recognition rates for synthetically generated results are comparable, even slightly higher than for the real footage. This may be due to the stylization of the expression in the synthesis. Confusion matrices between the different expressions are shown in FIG. 22. Tender and neutral expressions are most easily confused in all cases. While some emotions are better recognized from audio only, the overall recognition rate is higher when using both cues.

To determine the qualitative effect of the AAM on the final system preference tests were performed on systems built using the different AAMs. For each preference test 10 sentences in each of the six emotions were generated with two models rendered side by side. Each pair of AAMs was evaluated by 10 users who were asked to select between the left model, right model or having no preference (the order of our model renderings was switched between experiments to avoid bias), resulting in a total of 600 pairwise comparisons per preference test.

In this experiment the videos were shown without audio in order to focus on the quality of the face model. From table 1 shown in FIG. 23 it can be seen that AAMfull achieved the highest score, and that AAMregions is also preferred over the standard AAM. This preference is most pronounced for expressions such as angry, where there is a large amount of head motion and less so for emotions such as neutral and tender which do not involve significant movement of the head.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A method of animating a computer generation of a face having a mouth, the method comprising:
receiving a text input related to speech, which is to be output by movement of the mouth;
dividing the text input into a sequence of acoustic units including one of at least phonemes, graphemes, and words or parts of words;
analyzing the text input related to the speech to identify expression-dependent weightings related to a speech expression and a corresponding facial expression, to be input into a statistical model;
converting the sequence of acoustic units into a sequence of image vectors and a sequence of speech vectors using the statistical model, wherein the model has a plurality of model parameters comprising mathematical means of probability distributions, which relate an acoustic unit in the sequence of acoustic units to are image vector in the sequence of image vectors and to a speech vector in the sequence of speech vectors, the image vector including a plurality of parameters that define the face; and
outputting the sequence of image vectors and the sequence of speech vectors,
wherein the sequence of image vectors are output as video such that the mouth moves to mime the speech expression associated with the corresponding facial expression, and
wherein the sequence of speech vectors are output as audio, which is synchronized with lip movement of the mouth and is associated with the speech expression,
wherein the mathematical means of each probability distribution of the probability distributions for the speech expression and the corresponding facial expression are expressed as a weighted sum of independent mathematical means,
wherein weightings used in the weighted sum are the identified expression-dependent weightings,
wherein the independent mathematical means are provided in clusters, and
wherein here is one expression-dependent weighting per cluster.

2. The method according to claim 1,
wherein each cluster includes at least one sub-cluster,
and wherein the identified expression dependent weightings are retrieved for said each cluster such that there is one weight per sub-cluster.

3. The method according to claim 2, wherein the at least one sub-cluster includes at least one decision tree being based on questions relating to at least one of linguistic differences, phonetic differences, and prosodic differences.

4. The method according to claim 2,
further comprising selecting the speech expression from at least one of different emotions, different accents, or different speaking styles,
wherein the selecting includes randomly selecting a set of the identified expression dependent weightings from a plurality of pre-stored sets of the identified expression dependent weightings, and
wherein each selected set of the identified expression dependent weightings includes weightings for the at least one sub-cluster.

5. The method according to claim 1, further comprising selecting the speech expression from at least one of different emotions, different accents, or different speaking styles.

6. The method according to claim 5, wherein the converting the sequence of the acoustic units into the sequence of image vectors and the sequence of speech vectors using the statistical model includes retrieving the identified expression dependent weightings for the selected speech expression.

7. The method according to claim 5, wherein the selecting includes providing an input to allow the identified expression-dependent weightings to be selected via the input by a user.

8. The method according to claim 5, wherein the selecting includes predicting the identified expression-dependent weightings to be used from external information about the speech to be output by the movement of the mouth.

9. The method according to claim 5, wherein the selecting includes receiving a video input containing the face and varying the identified expression-dependent weightings to simulate an expression on a face of the video input.

10. The method according to claim 5, wherein the selecting includes receiving an audio input containing the speech to be output by the movement of the mouth and obtaining the identified expression-dependent weightings from the audio input.

11. The method according to claim 1, further comprising constructing the face from the image vector including the plurality of parameters that define the face, said parameters permitting constructing the face from a weighted sum of modes representing reconstructions of the face or a part of the face.

12. The method according to claim 11, wherein the weighted sum of modes includes modes to represent a shape of the face and an appearance of the face.

13. The method according to claim 12, wherein a same weighting of the identified expression-dependent weightings is used for a shape mode and a corresponding appearance mode of the modes to represent the shape of the face and the appearance of the face.

14. The method according to claim 11, wherein at least one of the modes from the weighted sum of modes represents a pose of the face.

15. The method according to claim 11, wherein a plurality of the modes from the weighted sum of modes represents a deformation of regions of the face.

16. The method according to claim 11, wherein at least one of the modes from the weighted sum of modes represents blinking.

17. The method according to claim 11, wherein at least one of the modes from the weighted sum of modes represents blinking.

18. The method according to claim 11, wherein static features of the face are modelled with a fixed shape and a fixed texture.

19. A non-transitory computer-readable storage medium having computer-readable instructions stored thereon, which when executed by a computer cause the computer to perform the method of claim 1.

20. A method of adapting a system for rendering a computer generated face to a new expression, the method comprising:
receiving text data related to speech, which is to be output by movement of the mouth;
dividing the text data into a sequence of acoustic units including one of at least phonemes, graphemes, and words or parts of words;
analyzing the text data related to the speech to identify expression-dependent weightings related to a speech expression and a corresponding facial expression, to be input into a statistical model;
converting the sequence of acoustic units into a sequence of image vectors and a sequence of speech vectors using the statistical model, wherein the model has a plurality of model parameters comprising mathematical means of probability distributions, which relate an acoustic unit in the sequence of acoustic units to an image vector in the sequence of image vectors and to a speech vector in the sequence of speech vectors, the image vector including a plurality of parameters that define the face;
outputting the sequence of image vectors and the sequence of speech vectors,
wherein the sequence of image vectors are output as video such that the mouth moves to mime the speech expression associated with the corresponding facial expression, and
wherein the sequence of speech vectors are output as audio, which is synchronized with lip movement of the mouth and is associated with the speech expression,
wherein the mathematical means of each probability distribution of the probability distributions for the speech expression and the corresponding facial expression are expressed as a weighted sum of independent mathematical means,
wherein weightings used in the weighted sum are the identified expression-dependent weightings,
wherein the independent mathematical means are provided in clusters, and
wherein here is one expression-dependent weighting per cluster,
receiving a video file associated with the new expression; and
calculating the identified expression-dependent weightings to weigh parameters of a same type in order to maximize a similarity between the computer generated face and the new expression.

21. The method according to claim 20, further comprising:
creating at least one new cluster using data from the received video file; and
calculating the identified expression-dependent weightings applied to the clusters including the at least one new cluster to maximize the similarity between the computer generated face and the new expression.

22. A non-transitory computer-readable storage medium having computer-readable instructions stored thereon, which when executed by a computer cause the computer to perform the method of claim 20.

23. A system for animating a computer generation of a face having a mouth, the system comprising:
a text input configured to receive data related to speech, which is to be output by movement of the mouth; and
a processor configured to:
divide the received data into a sequence of acoustic units including one of at least phonemes, graphemes, and words or parts of words;
analyze the received data related to the speech to identify expression-dependent weightings related to a speech expression and a corresponding facial expression, to be input into a statistical model;
convert the sequence of acoustic units into a sequence of image vectors and a sequence of speech vectors using the statistical model, wherein the model has a plurality of model parameters comprising mathematical means of probability distributions, which relate an acoustic unit in the sequence of acoustic units to an image vector in the sequence of image vectors and to a speech vector in the sequence of speech vectors, the age vector including a plurality of parameters that define the face; and
output the sequence of image vectors and the sequence of speech vectors,
wherein the sequence of image vectors are output as video such that the mouth moves to mime the speech expression associated with the corresponding facial expression, and
wherein the sequence of speech vectors are output as audio, which is synchronized with lip movement of the mouth and is associated with the speech expression,
wherein the mathematical means of each probability distribution of the probability distributions for the speech expression and the corresponding facial expression are expressed as a weighted sum of independent mathematical means,
wherein weightings used in the weighted sum are the identified expression-dependent weightings
wherein the independent mathematical means are provided in clusters, and
wherein there is one expression-dependent weighting per cluster.

24. An adaptable system for rendering a computer generated face to a new expression, the system comprising:
- a text input configured to receive data related to speech, which is to be output by movement of the mouth;
- a processor configured to:
  - divide the received data into a sequence of acoustic units including one of at least phonemes, graphemes, and words or parts of words;
  - analyze the received data related to the speech to identify expression-dependent weightings related to a speech expression and a corresponding facial expression, to be input into a statistical model;
  - convert the sequence of acoustic units into a sequence of image vectors and a sequence of speech vectors using the statistical model, wherein the model has a plurality of model parameters comprising mathematical means of probability distributions, which relate an acoustic unit in the sequence of acoustic units to an image vector in the sequence of image vectors and to a speech vector in the sequence of speech vectors, the image vector including a plurality of parameters that define the face;
  - output the sequence of image vectors and the sequence of speech vectors,
  - wherein the sequence of image vectors are output as video such that the mouth moves to mime the speech expression associated with the corresponding facial expression, and
  - wherein the sequence of speech vectors are output as audio, which is synchronized with lip movement of the mouth and is associated with the speech expression,
  - wherein the mathematical means of each probability distribution of the probability distributions for the speech expression and the corresponding facial expression are expressed as a weighted sum of independent mathematical means,
  - wherein weightings used in the weighted sum are the identified expression-dependent weightings,
  - wherein the independent mathematical means are provided in clusters, and
  - wherein there is one expression-dependent weighting per cluster;
  - receive a video file associated with the new expression; and
  - calculate the identified expression-dependent weightings to weigh parameters of a same type in order to maximize a similarity between the computer generated face and the new expression.

* * * * *